(12) United States Patent
Furuichi

(10) Patent No.: US 12,550,175 B2
(45) Date of Patent: Feb. 10, 2026

(54) COMMUNICATION CONTROL DEVICE, COMMUNICATION DEVICE, AND COMMUNICATION CONTROL METHOD

(71) Applicant: Sony Group Corporation, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 404 days.

(21) Appl. No.: 18/245,722

(22) PCT Filed: Sep. 13, 2021

(86) PCT No.: PCT/JP2021/033506
§ 371 (c)(1),
(2) Date: Mar. 17, 2023

(87) PCT Pub. No.: WO2022/065104
PCT Pub. Date: Mar. 31, 2022

(65) Prior Publication Data
US 2023/0362970 A1    Nov. 9, 2023

(30) Foreign Application Priority Data
Sep. 24, 2020 (JP) .................................. 2020-159974

(51) Int. Cl.
*H04W 28/02* (2009.01)
*H04W 72/12* (2023.01)
*H04W 72/541* (2023.01)

(52) U.S. Cl.
CPC ..... *H04W 72/541* (2023.01); *H04W 72/1215* (2013.01)

(58) Field of Classification Search
CPC ......... H04L 5/005; H04L 5/10; H04L 5/0007; G01S 5/0036; H04W 16/14; H04W 72/04;
(Continued)

(56) References Cited

U.S. PATENT DOCUMENTS

2015/0230255 A1*  8/2015  Lopes ............... H04W 72/0453
                                                                        370/329
2020/0067661 A1*  2/2020  Siomina ................ G01S 5/0036

FOREIGN PATENT DOCUMENTS

JP    2016-123110 A    7/2016
WO    2020/049992 A1   3/2020

OTHER PUBLICATIONS

International Search Report and Written Opinion mailed on Nov. 30, 2021, received for PCT Application PCT/JP2021/033506, filed on Sep. 13, 2021, 10 pages including English Translation.
(Continued)

*Primary Examiner* — Phuoc H Doan
(74) *Attorney, Agent, or Firm* — XSENSUS LLP

(57) ABSTRACT

A method and corresponding control circuitry that receives, from a secondary use communication device that provides the secondary communication service that is a communication service using at least a part of a frequency band used by a primary communication service, a request for using the frequency band, including information of a secondary use communication device group including the secondary use communication device. The control circuitry generates a first response according to a result of a judgment related to the use of the frequency band in the received request. Based on the judgment result, the control circuitry generates a second response including the information regarding the use in the secondary use communication device group. The control circuitry controls a transmitter to transmit the generated first response and second response to the secondary use communication device.

14 Claims, 24 Drawing Sheets

(58) Field of Classification Search
CPC ... H04W 52/243; H04W 52/36; H04W 24/10; H04W 4/029; H04B 17/336; H04B 17/20
See application file for complete search history.

(56) References Cited

OTHER PUBLICATIONS

"CBRS Coexistence Technical Specifications", CBRSA-TS-2001, V2.0.0, Jan. 6, 2019, pp. 1-23.
"Signaling Protocols and Procedures for Citizens Broadband Radio Service (CBRS): Extensions to Spectrum Access System (SAS)—Citizens Broadband Radio Service Device (CBSD) Interface Technical Specification (Release 2)", WINNF-TS-3002-V1.0.0, Mar. 5, 2020, pp. 1-40.
"Signaling Protocols and Procedures for Citizens Broadband Radio Service (CBRS): Spectrum Access System (SAS)—Citizens Broadband Radio Service Device (CBSD) Interface Technical Specification", WINNF-TS-0016-V1.2.5, May 18, 2020, pp. 1-52.
"Test and Certification for Citizens Broadband Radio Service (CBRS); Conformance and Performance Test Technical Specification; SAS as Unit Under Test (UUT)", WINNF-TS-0061-V1.5.1, Oct. 7, 2019, pp. 1-180.

\* cited by examiner

Definition of Channel Bandwidth and
Transmission Bandwidth Configuration for one E-UTRA Transmission bandwidth configuration $N_{RB}$ in E-UTRA channel bandwidths

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Definition of channel bandwidth and transmission bandwidth configuration for one NR channel Minimum guardband (kHz) (FR1)

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 30 | N.A | 1010 | 990 | 1330 | 1310 | 1290 | 1610 | 1570 | 1530 | 1490 | 1450 | 1410 | 1370 |

FIG.13

Minimum guardband (kHz) (FR2)

| SCS (kHz) | 50MHz | 100MHz | 200MHz | 400MHz |
|---|---|---|---|---|
| 60 | 1210 | 2450 | 4930 | N.A |
| 120 | 1900 | 2420 | 4900 | 9860 |

FIG.14

Minimum guardband (kHz) of SCS 240 kHz SS/PBCH block (FR2)

| SCS (kHz) | 100MHz | 200MHz | 400MHz |
|---|---|---|---|
| 240 | 3800 | 7720 | 15560 |

FIG.18

| Parameter | R/O/C | Parameter Information |
|---|---|---|
| NAME: *registrationRequest*<br>DATA TYPE: array of object: *RegistrationRequest* | Required | Array of *RegistrationRequest* data objects. Each *RegistrationRequest* data object represents a registration request of a CBSD. |

| Parameter | R/O/C | Parameter Information |
|---|---|---|
| NAME: *groupingParam*<br>DATA TYPE: array of object: *GroupParam*<br>EXTENSION TYPE: RELEASE 2 ENHANCEMENT<br>FEATURE ID: WF_ENHANCED_GROUP_HANDLING | Optional | An array of data objects that includes information on CBSD grouping. For Release 2 operation, see *GroupParam* object details in WINNF-SSC-0010 [n.12]. For Release 1 operation, see *GroupParam* object definition and permitted enumerations in WINNF-TS-0016 [n.1]. |

| Parameter | R/O/C | Parameter Information |
|---|---|---|
| NAME: *registrationResponse*<br>DATA TYPE: array of object: *RegistrationResponse* | Required | This parameter is an array of *RegistrationResponse* data objects. Each *RegistrationResponse* data object represents a registration response to a registration request from a CBSD. |

811

| Parameter | R/O/C | Parameter Information |
|---|---|---|
| NAME: *groupingConfig*<br>DATA TYPE: array of object: *GroupConfig*<br>EXTENSION TYPE: RELEASE 2<br>FEATURE ID:<br>WF_ENHANCED_GROUP_HANDLING | Optional | An array of data objects that includes information concerning group configuration. |
| NAME: *response*<br>DATA TYPE: object: *Response* | Required | This parameter includes information on whether the corresponding CBSD request is approved or disapproved for a reason. See details in section 8.16. |

812

| Parameter | R/O/C | Parameter Information |
|---|---|---|
| NAME: *responseCode*<br>DATA TYPE: number | Required | An integer to indicate the type of result. The value 0 means the corresponding CBSD request is successful. This shall be one of the values defined in Table 46. |
| NAME: *responseMessage*<br>DATA TYPE: string | Optional | A short description of the result. |
| NAME: *responseData*<br>DATA TYPE: Dependent on *responseCode*-see Table 47. | Optional | Additional data can be included to help the CBSD resolve failures. |

FIG. 20

| Parameter | R/O/C | Parameter Information |
|---|---|---|
| NAME: *groupType*<br>DATA TYPE: string<br>EXTENSION TYPE: RELEASE 2<br>FEATURE ID:<br>WF_ENHANCED_GROUP_HANDLING | Required | Identifies the type of group that the CBSD belongs to.<br>Acceptable values of this parameter are defined in<br>WINNF-SSC-0010 [n.12]. |
| NAME: *groupId*<br>DATA TYPE: string<br>EXTENSION TYPE: RELEASE 2<br>FEATURE ID:<br>WF_ENHANCED_GROUP_HANDLING | Required | Identifies a particular group of the specified type of group (*groupType*).<br>Acceptable values of this parameter are defined in<br>WINNF-SSC-0010 [n.12]. |
| NAME: *supportedBySas*<br>DATA TYPE: boolean<br>EXTENSION TYPE: RELEASE 2<br>FEATURE ID:<br>WF_ENHANCED_GROUP_HANDLING | Conditional | This parameter indicates whether *groupType* and/or *groupId* is supported by the SAS.<br>It shall be included if the corresponding request message includes the *groupingParam* parameter and the indicated *groupType* and/or *groupId* are not supported by the SAS. The default value is true.<br>true: supported, false: not supported |
| NAME: *groupConfigInfo*<br>DATA TYPE: object: *GroupConfigInfo*<br>EXTENSION TYPE: RELEASE 2<br>FEATURE ID:<br>WF_ENHANCED_GROUP_HANDLING | Optional | This JSON object is specified by the organization, entity or individual that specifies the *groupId*.<br>See details of *GroupConfigInfo* object definition in<br>WINNF-SSC-0010 [n.12]. |

| Parameter | R/O/C | Parameter Information |
|---|---|---|
| NAME: *cbrsAllianceConfig*<br>DATA TYPE: object:<br>*CbrsAllianceConfig* | Optional | This parameter is included if the CxM intends to configure the CBSD with specified coexistence parameter values. |
| NAME: *groupResponse*<br>DATA TYPE: object:<br>*GroupResponse* | Required | This parameter contains the information of the results of the Grouping information processing. |

831

| Parameter | R/O/C | Parameter Information |
|---|---|---|
| NAME: *groupResponseCode*<br>DATA TYPE: number | Required | This parameter indicates the Group Response Code representing the result of the Grouping information processing. |
| NAME: *shortDescription*<br>DATA TYPE: string | Optional | Human readable short description on the result of the Grouping information processing. |

FIG.22

| CODE NUMBER | RESPONSE | DESCRIPTION |
|---|---|---|
| 0 | SUCCESS | REQUEST NORMAL TERMINATION |
| 100 | VERSION | PROTOCOL VERSION IN REQUEST IS NOT SUPPORTED |
| 101 | BLACKLISTED | CBSD AS SENDER OF REQUEST IS BLACKLISTED |
| 102 | MISSING_PARAM | MISSING ESSENTIAL PARAMETER |
| 103 | INVALID_VALUE | PARAMETER VALUE IS INVALID |
| 104 | CERT_ERROR | ERROR IN CERTIFICATE OF HTTPS COMMUNICATION |
| 105 | DEREGISTER | AUTOMATIC DEREGISTRATION OF CBSD AS SENDER OF REQUEST |
| 200 | REG_PENDING | PART OF REGISTRATION INFORMATION IS UNREGISTERED |
| 201 | GROUP_ERROR | ERROR IN GROUP PARAMETER |
| 300 | UNSUPPORTED_SPECTRUM | PART OF REQUIRED FREQUENCY BAND IS OUTSIDE CBRS BAND |
| 400 | INTERFERENCE | EXCESSIVE INTERFERENCE |
| 401 | GRANT_CONFLICT | CONFLICT OF OPERATIONAL PARAMETER OF GRANT REQUEST WITH EXISTING GRANT |
| 500 | TERMINATED_GRANT | TERMINATION OF GRANT |
| 501 | SUSPENDED_GRANT | SUSPENSION OF RADIO WAVE TRANSMISSION BASED ON GRANT |
| 502 | UNSYNC_OP_PARAM | GRANTS ASYNCHRONOUS |

FIG.23

| CODE NUMBER | RESPONSE | DESCRIPTION |
|---|---|---|
| 0 | SUCCESS | REQUEST NORMAL TERMINATION |
| 100 | VERSION | PROTOCOL VERSION IN REQUEST IS NOT SUPPORTED |
| 101 | BLACKLISTED | CBSD AS SENDER OF REQUEST IS BLACKLISTED |
| 102 | MISSING_PARAM | MISSING ESSENTIAL PARAMETER |
| 103 | INVALID_VALUE | PARAMETER VALUE IS INVALID |
| 104 | TIME_UNSYNC | TIME ASYNCHRONOUS |
| 105 | DISASSOCIATE | AUTOMATIC DEREGISTRATION OF CBSD AS SENDER OF REQUEST |
| 106 | CROSS_LINK_INTERFERENCE | CROSSLINK EXCESSIVE INTERFERENCE |
| 107 | INVALID_SUB_GROUP | SUBGROUP INFORMATION IS INVALID |
| 400 | NONCOMPLIANT_CHANNEL | INCOMPATIBILITY OF GRANT FREQUENCY RANGE |
| 500 | RECONFEGURAION | RECONFIGURE GROUP CONFIGURATION INFORMATION |

FIG.24

| CODE NUMBER | RESPONSE | OPERATION |
|---|---|---|
| 0 | SUCCESS | NORMAL OPERATION |
| 100 | VERSION | ADAPT TO MATCH PROTOCOL VERSION |
| 101 | BLACKLISTED | WAIT UNTIL DELETION FROM BLACKLIST |
| 102 | MISSING_PARAM | ACQUIRE ESSENTIAL PARAMETER |
| 103 | INVALID_VALUE | CORRECT PARAMETER VALUE |
| 104 | TIME_UNSYNC | PERFORM SYNCHRONIZATION PROCESSING |
| 105 | DISASSOCIATE | RE-APPLY FOR GROUP PARTICIPATION |
| 106 | CROSS_LINK_INTERFERENCE | REMOVE CROSSLINK EXCESSIVE INTERFERENCE |
| 107 | INVALID_SUB_GROUP | CORRECT SUBGROUP INFORMATION |
| 400 | NONCOMPLIANT_CHANNEL | OPERATION BASED ON JUDGMENT OF OPERATOR |
| 500 | RECONFEGURAION | SET PARAMETER BASED ON GROUP CONFIGURATION INFORMATION |

```
{
    "registrationRequest": [{
        "fccId": "abc123",
        "cbsdCategory": "A",
        "callSign": "CB987",
        "userId": "John Doe",
        "cbsdFeatureCapabilityList": ["WF_ENHANCED_GROUP_HANDLING"],
        "airInterface": {
            "radioTechnology": "E_UTRA"
        },
        "cbsdSerialNumber": "abcd1234",
        "measCapability": [
            "RECEIVED_POWER_WITHOUT_GRANT"
        ],
        "installationParam": {
            "latitude": 37.419735,
            "longitude": -122.072205,
            "height": 6,
            "heightType": "AGL",
            "indoorDeployment": true
        },
        "groupingParam": [{
            "groupId": "CBRS_ALLIANCE",
            "groupType": "COEXISTENCE_GROUP",
            "groupInfo": {
                "cbrsAllianceInfo": {
                    "cbrsaVersion": "v3.0",
                    "frameStructure": ["FS2"],
                    "desiredTddConfig": {
                        "ulDLConfig": 1,
                        "ssfConfig": 1
                    }
                }
            }
        },
        {
            "groupId": "SFG_1",
            "groupType": "SINGLE_FREQUENCY_GROUP"
        }
        ]
    }]
}
```

```
{
    "registrationResponse": [{
        "cbsdId": "abc123/abcd1234",
        "sasFeatureCapabilityList": ["WF_ENHANCED_GROUP_HANDLING"],
        "response": {
            "responseCode": 0,
            "responseMessage": "CBSD Registration has successfully complemented, but an error has been found in the grouping information. See details in the groupingConfig parameter."
        },
        "groupingConfig": [{
            "groupId": "CBRS_ALLIANCE",
            "groupType": "COEXISTENCE_GROUP",
            "supportedBySas": true,
            "groupConfigInfo": {
                "cbrsAllianceConfig": {
                    "cbrsaVersion": "v3.0",
                    "eutraTddConfig": {
                        "ulDLConfig": 0,
                        "ssfConfig": 1
                    }
                },
                "groupResponse": {
                    "groupResponseCode": 103,
                    "groupResponseMessage": "FS1 is not allowed for framestructure",
                    "groupResponseData": ["frameStructure"]
                }
            }
        },
        {
            "groupId": "SFG_1",
            "groupType": "SINGLE_FREQUENCY_GROUP",
            "supportedBySas": true,
            "groupConfigInfo": {
                "groupResponse": {
                    "groupResponseCode": 0
                }
            }
        }
        ]
    }]
}
```

```
{
    "heartbeatRequest": [{
        "cbsdId": "abc123/abcd1234",
        "grantId": "0000-1111-2222",
        "operationState": "AUTHORIZED"
    }]
}
```

```
{
    "heartbeatResponse": [{
        "cbsdId": "abc123/abcd1234",
        "grantId": "0000-1111-2222",
        "transmitExpireTime": "2020-12-31T23:59:59Z",
        "response": {
            "responseCode": 0,
            "responseMessage": "The SAS recommends you to reconfigure TDD configuration as specified in the groupingConfig parameter when you request a new Grant based on the operationParam parameter."
        },
        "operationParam": {
            "frequencyRange": {
                "lowFrequency": 3660000000,
                "highFrequency": 3670000000
            },
            "maxEirp": 15
        },
        "groupingConfig": [{
            "groupId": "CBRS_ALLIANCE",
            "groupType": "COEXISTENCE_GROUP",
            "supportedBySas": true,
            "groupConfigInfo": {
                "cbrsAllianceConfig": {
                    "cbrsaVersion": "v3.0",
                    "eutraTddConfig": {
                        "ulDLConfig": 0,
                        "ssfConfig": 1
                    },
                    "cbsdFrequencyGuidance": [{
                        "lowFrequency": 3660000000,
                        "highFrequency": 3670000000
                    }]
                },
                "groupResponse": {
                    "groupResponseCode": 500,
                    "groupResponseMessage": "Recommends you to reconfigure the parameters as specified in this configuration information."
                }
            }
        },
        {
            "groupId": "SFG_1",
            "groupType": "SINGLE_FREQUENCY_GROUP",
            "supportedBySas": true,
            "groupConfigInfo": {
                "groupResponse": {
                    "groupResponseCode": 0
                }
            }
        }
        ]
    }]
}
```

COMMUNICATION CONTROL DEVICE, COMMUNICATION DEVICE, AND COMMUNICATION CONTROL METHOD

CROSS-REFERENCE TO RELATED APPLICATIONS

The present application is based on PCT filing PCT/JP2021/033506, filed Sep. 13, 2021, which claims priority to Japanese Application No. 2020-159974, filed Sep. 24, 2020, the entire contents of each are incorporated herein by reference.

FIELD

The present disclosure relates to a communication control device, a communication device, and a communication control method.

BACKGROUND

There is an emerging problem of exhaustion of radio resources available for allocation to radio systems (radio devices). Therefore, in recent years, dynamic spectrum sharing referred to as "Dynamic Spectrum Access (DSA)" that utilizes a temporally or spatially unused space (white space) among frequency bands allocated to a specific radio system has rapidly attracted attention.

CITATION LIST

Non Patent Literature

Non Patent Literature 1: WINNF-TS-0016-V1.2.5 Signaling Protocols and Procedures for Citizens Broadband Radio Service (CBRS): Spectrum Access System (SAS)—Citizens Broadband Radio Service Device (CBSD) Interface Technical Specification, (U.S.), 2020

Non Patent Literature 2: WINNF-TS-3002-V1.0.0 Signaling Protocols and Procedures for Citizens Broadband Radio Service (CBRS): Extensions to Spectrum Access System (SAS)—Citizens Broadband Radio Service Device (CBSD) Interface Technical Specification (Release 2), (U.S.), 2020

Non Patent Literature 3: CBRSA-TS-2001 CBRS Coexistence Technical Specifications, (U.S.), 2019

Non Patent Literature 4: WINNF-TS-0061 Test and Certification for Citizens Broadband Radio Service (CBRS); Conformance and Performance Test Technical Specification; SAS as Unit Under, (U.S.), 2019

SUMMARY

Technical Problem

As the above DSA, the standard of the Citizens Broadband Radio Service (CBRS) has been formulated by the Wireless Innovation Forum (WINNF). The CBRS is a service that implements spectrum sharing between a 3.5 GHz band marine in-ship radar and the commercial radio communication service in the United States. The CBRS provides a system that shares radio waves of an in-ship radar system of the United States, which is a primary user, with the radio communication service, which is a secondary user. This radio communication service as the secondary user uses a base station referred to as a Citizens Broadband Service Device (CBSD). After granted permission to use radio waves from a spectrum access system (SAS), CBSD provides radio communication services to radio communication terminals.

The exchange between SAS and CBSD is performed based on a protocol defined in WINNF. Release 1 (Non Patent Literature 1) of the SAS-CDSD Protocol, which is one of the protocols, has defined a response code of SAS for a request for use of a frequency band transmitted from the CBSD. This response code indicates an outline of a processing result in SAS. Release 2 (Non Patent Literature 2) of the SAS-CDSD Protocol also uses a response code of Release 1 and has defined a new response code.

Meanwhile, Release 2 has introduced extended CBSD group processing (referred to as Enhanced CBSD group handling). In Release 1, an opportunity for the CBSD to transmit group information of the CBSD to the SAS has been limited to the registration procedure of the CBSD. However, Release 2 has made it possible for the CBSD to perform transmission of the information in other procedures. In addition, it has also made it possible for SAS to provide registration information according to the group to which the CBSD belongs, based on CBSD group information. By adopting the extended CBSD group processing by both SAS and CBSD, it is possible to support the coexistence standard (Non Patent Literature 3) defined by the CBRS Alliance. This coexistence standard defines a coexistence manager (CxM) which is responsible for coexistence with the primary user of a General Authorized Access Tier corresponding to the secondary user. The CxM performs operation such as allocation of frequency bands so as to reduce interference between the General Authorized Access Tier and the CBSD, and determines coexistence of the General Authorized Access Tier. CxM can be implemented as a function of SAS.

However, with the above-described conventional techniques, there is a possibility of occurrence of a conflict of response codes when CxM is installed on SAS. In an exemplary case where a plurality of CBSDs has requested the same SAS to use the frequency band, the CxM disposed in the SAS might output a response code that denies the authorization of the use of the frequency band due to the interference between the two CBSDs, even with authorization from the SAS. In such a case, the original SAS response code would be overwritten with the CxM response code, leading to hindrance of the SAS function. Thigh might result in a failure in the test of Non Patent Literature 4.

In view of this situation, the present disclosure proposes a communication control device, a communication device, and a communication control method capable of preventing the hindrance of the function of the SAS even when the CxM is installed in the SAS.

Solution to Problem

A communication control device according to the present disclosure includes: a reception unit that receives, from a secondary use communication device that provides a secondary communication service that is a communication service using at least a part of a frequency band used by a primary communication service, a request for using the frequency band including information regarding a secondary use communication device group including the secondary use communication device; a first determination unit that generates a first response according to a result of a judgment regarding the use of the frequency band in the received request; a second determination unit that generates a second response including information regarding the use in the secondary use communication device group based on the result of the judgment; and a transmission unit that transmits the generated first response and second response to the secondary use communication device.

BRIEF DESCRIPTION OF DRAWINGS

FIG. 13 is a diagram illustrating specifications of a transmission bandwidth in NR.

FIG. 14 is a diagram illustrating specifications of a transmission bandwidth in NR.

FIG. 18 is a diagram illustrating a registration request according to the second embodiment of the present disclosure.

FIG. 19 is a diagram illustrating a registration response according to the second embodiment of the present disclosure.

FIG. 20 is a diagram illustrating a definition of a "GroupConfig" object according to the second embodiment of the present disclosure.

FIG. 21 is a diagram illustrating a definition of a "GroupConfigInfo" object according to the second embodiment of the present disclosure.

FIG. 22 is a diagram illustrating a configuration example of a first response code according to the second embodiment of the present disclosure.

FIG. 23 is a diagram illustrating a configuration example of a second response code according to the second embodiment of the present disclosure.

FIG. 24 is a diagram illustrating an example of an operation of the base station device according to the second embodiment of the present disclosure.

FIG. 25 is a diagram illustrating a configuration of a request according to the second embodiment of the present disclosure.

FIG. 26 is a diagram illustrating a configuration of a response according to the second embodiment of the present disclosure.

FIG. 27 is a diagram illustrating another configuration of the request according to the second embodiment of the present disclosure.

FIG. 28 is a diagram illustrating another configuration of the response according to the second embodiment of the present disclosure.

DESCRIPTION OF EMBODIMENTS

Figure 1:
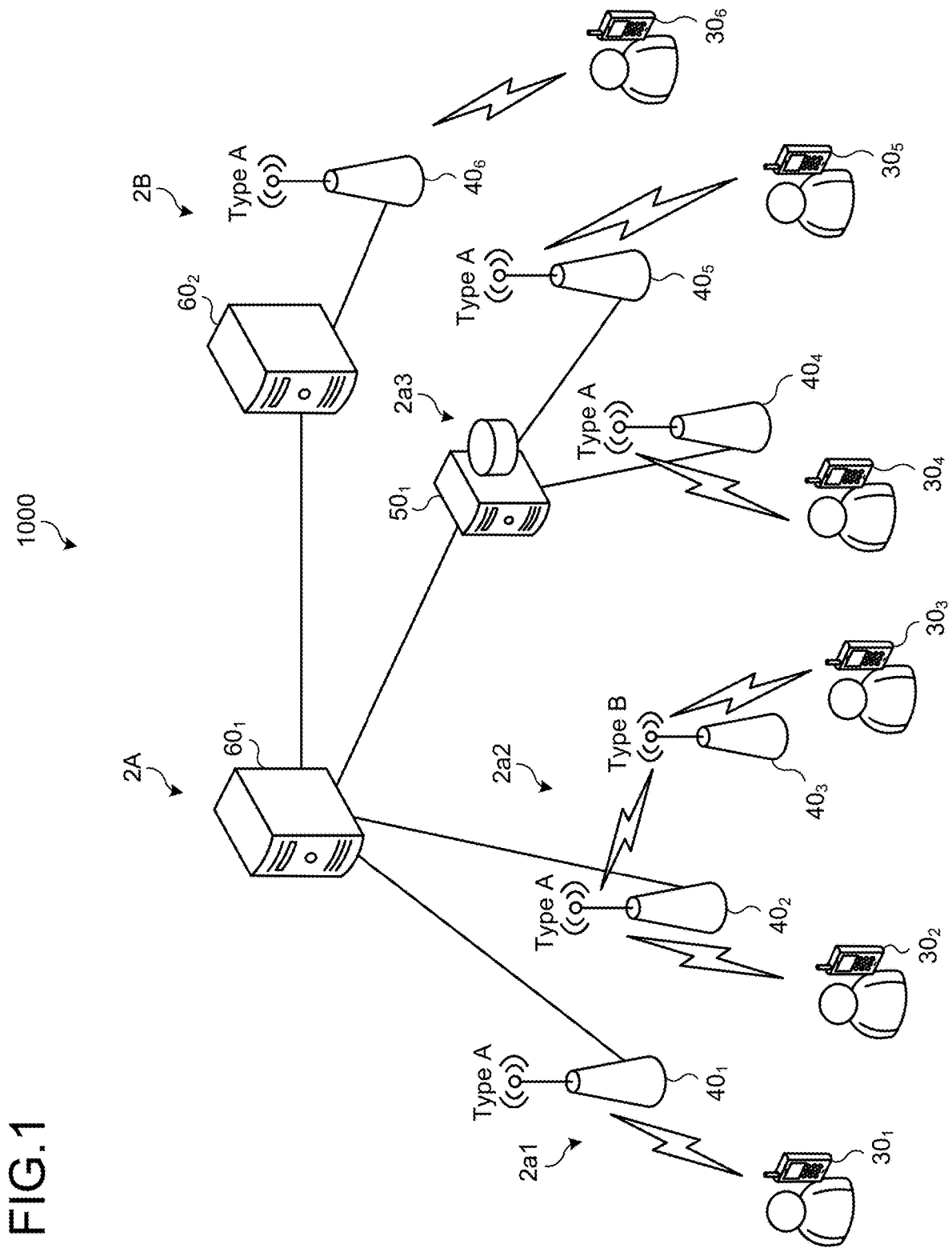
FIG. 1 is a diagram illustrating a configuration example of a communication system according to an embodiment of the present disclosure.

Moreover, in the present specification and the drawings, a plurality of components having substantially the same functional configuration will be distinguished by attaching different numbers or alphabets after the same reference numerals. For example, a plurality of configurations having substantially the same functional configuration is distinguished as necessary, such as communication control devices $60_1$ and $60_2$. Moreover, a plurality of configurations having substantially the same functional configuration is distinguished as necessary, such as communication systems 2A and 2B. However, when it is not particularly necessary to distinguish between the plurality of components having substantially the same functional configuration, only the same reference numeral is given. For example, when there is no need to distinguish between the communication control devices $60_1$ and $60_2$ in particular, they are simply referred to as a communication control device 60. Furthermore, when there is no need to distinguish between the communication systems 2A and 2B in particular, they are simply referred to as a communication system 2.

Embodiments of the present disclosure will be described below in detail with reference to the drawings. The description will be given in the following order. Note that, in each of the following embodiments, the same parts are denoted by the same reference symbols, and a repetitive description thereof will be omitted.

1. Overview of communication system
1.1. Configuration of communication system
1.2. Configuration of terminal device
1.3. Configuration of base station device
1.4. Configuration of communication control device
1.5. Terms related to spectrum and sharing
2. Description of various procedures
2.1. Registration procedure
2.1.1. Details of required parameters
2.1.1.1. Supplement to required parameters
2.1.2. Details of registration process
2.2. Available spectrum query procedure
2.2.1. Details of required parameters
2.2.2. Details of available spectrum evaluation process
2.3. Spectrum grant procedure
2.3.1. Details of spectrum grant process
2.4. Spectrum use notification/heartbeat
2.5. Supplement to various procedures 2.6. Various procedures related to terminal
2.7. Procedure occurring between communication control devices
2.7.1. Information exchange
2.7.2. Command/request procedure
2.8. Information transmission means
2.8.1. Signaling between communication control device and communication device
2.8.2. Signaling between communication device and terminal
2.8.3. Terminal-to-terminal signaling
3. Configuration of proposed system
3.1. First embodiment
3.2. Second embodiment 1. Overview of Communication System <1.1. Configuration of Communication System>

FIG. 1 is a diagram illustrating a configuration example of a communication system according to an embodiment of the present disclosure. FIG. 1 is a diagram illustrating a configuration of a communication system 1000 according to the present disclosure. The communication system 1000 includes a communication system 2. Note that the device in the figure can also be considered as a device in a logical sense. That is, parts of the device in the drawing may be partially actualized by a virtual machine (VM), a container, a docker, or the like, and they may be implemented on physically the same piece of hardware.

The communication system 2 includes a terminal device 30, a base station device 40, an intermediate device 50, and a communication control device 60. In the example of FIG. 1, the communication system 2 is illustrated as a communication system 2A and a communication system 2B. The communication system 2A includes a communication system 2a1, a communication system 2a2, and a communication system 2a3.

The communication system 2a1 includes a terminal device $30_1$ and a base station device $40_1$. The communication system 2a2 includes terminal devices $30_2$ and $30_3$ and base station devices $40_2$ and $40_3$. The communication system 2a3 includes terminal devices 304 and 30s, base station devices $40_4$ and $40_5$, and an intermediate device 501. The communication system 2B includes a terminal device 306 and a base station device 406. In the example of FIG. 1, the base station devices $40_1$ and $40_2$ as well as $40_4$ to $40_6$ are communication devices (Type A), and the base station device $40_3$ is a communication device (Type B).

Note that the communication system 2 does not necessarily have to include the communication control device 60. To describe by using the example of FIG. 1, each of the communication system 2a2 and the communication system 2a3 having an external communication control device 60 may be regarded as one communication system 2. Furthermore, the communication system 2 does not necessarily have to include the intermediate device 50. In the example of FIG. 1, the communication system 2a1 without the intermediate device 50 may be regarded as one communication system 2.

Note that the intermediate device 50 and the communication control device 60 may have a wireless communication function. In this case, the intermediate device 50 and the communication control device 60 can also be regarded as radio communication devices. In the following description, a radio communication device may be simply referred to as a communication device. The communication device is not limited to a radio communication device, and for example, a device capable of wired communication alone and not equipped with a wireless communication function can also be regarded as a communication device.

Typically, the base station device 40 is a radio device that provides a communication service to the terminals, such as a radio base station (Base Station, Node B, eNB, gNB, etc.) or a radio access point. The device may be a wireless relay device. The device may be an optical link device referred to as a Remote Radio Head (RHH). In the description of the invention disclosed in the present specification, unless otherwise noted, the base station device 40 is an entity constituting a secondary system that shares a part or all of a frequency band allocated to a primary system.

The coverage of the base station device 40 is allowed to have various sizes from a large size such as a macro cell to a small size such as a pico cell. One cell may be formed by a plurality of base station devices 40, such as the case of a distributed antenna system (DAS). Furthermore, in a case where the base station device 40 has a beamforming capability, a cell or a service area may be formed for each beam.

The present description assumes that there are two different types of base station devices 40. In the present description, the base station device 40 that can access the communication control device 60 without using a wireless path involving permission of the communication control device 60 is referred to as a "communication device (Type A)". For example, the base station device 40 capable of wired Internet connection can be regarded as the "communication device (Type A)". In addition, for example, even in the case of a wireless relay device having no wired Internet connection function, the wireless relay device may be regarded as a "communication device (Type A)" when a radio backhaul link using a spectrum that does not require the permission of the communication control device 60 is constructed with another communication device (Type A).

In the present description, the base station device 40 that cannot access the communication control device 60 without a wireless path involving the permission of the communication control device 60 is referred to as a "communication device (Type B)". For example, a wireless relay device that needs to construct a backhaul link using a spectrum that requires permission of the communication control device 60 can be regarded as the "communication device (Type B)". Furthermore, for example, it is allowable to handle a terminal device such as a smartphone having a wireless network providing function represented by tethering and using a spectrum that requires permission of the communication control device 60 for both the backhaul link and the access link, as the "communication device (Type B)".

The base station device 40 is not necessarily fixedly installed, and may be installed in a moving object such as an automobile. Furthermore, the communication device does not necessarily need to exist on the ground, and the communication device function may be provided on an object existing in the air or space, such as an aircraft, a drone, a helicopter, or a satellite, or on an object existing on the sea or under the sea, such as a ship or a submarine. Typically, such a mobile-type base station device 40 corresponds to the communication device (Type B), and performs wireless communication with another communication device (Type A), thereby ensuring an access route to the communication control device 60. As a matter of course, even a mobile communication device can be handled as the communication device (Type A) as long as the frequency/spectrum used in the wireless communication with the communication device (Type A) is not managed by the communication control device 60.

Unless otherwise specified, the description "communication device" is applied to any of the communication device (Type A) and the communication device (Type B).

The base station device 40 can be utilized, operated, and/or managed by various entities. Assumable examples of the entities include a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (incorporated educational institutions, boards of education of local governments, and the like), a real estate (building, apartment, etc.) administrator, or an individual. The present disclosure is not limited thereto. The base station device 40 may be a shared facility used by a plurality of business operators or a plurality of individuals. Installation and operation of the equipment may be performed by a third party different from the user.

The base station device 40 operated by business operators is typically connected to the Internet via a core network. Furthermore, operation management, and maintenance is performed by a function referred to as Operation, Administration & Maintenance (OA & M). Furthermore, for example, as illustrated in FIG. 1, there may be an intermediate device 50 (network manager) that integrally controls the base station device 40 in the network.

The terminal (User Equipment, User Terminal, User Station, Mobile Terminal, Mobile Station, and the like) is typically a communication device such as a smartphone. In addition, a device such as a professional camera having a communication function may be included. Furthermore, the terminal may be a communication device such as a broadcasting radio station (field pickup unit (FPU)) for television broadcasting. For example, the terminal need not be a device used by a human. Like a form of machine type communication (MTC), a device such as a machine in a factory or a sensor installed in a building may be connected to the network. In addition, a device referred to as customer premises equipment (CPE) provided to ensure Internet connection may behave as a terminal.

Furthermore, as represented by D2D and V2X, a relay communication function may be provided on the terminal side.

Furthermore, the terminal does not necessarily need to exist on the ground. An object existing in the air or space, such as an aircraft, a drone, a helicopter, a HAPS, a balloon, or a satellite, or on an object existing on the sea or under the sea, such as a ship or a submarine, may operate as a terminal.

In the description of the invention disclosed in the present specification, unless otherwise specified, the terminal corresponds to an entity that terminates a radio link using the spectrum that requires permission of the communication control device 60. However, depending on a function included in the terminal or a network topology to which the terminal is applied, the terminal can perform an operation equivalent to that of the base station device 40. In other words, in the implementation of the present disclosure, the base station device may be referred to as a terminal or the terminal may be referred to as a base station device according to the network topology.

The communication control device 60 is typically a device that performs determination and/or permission, instruction, management of communication parameters of the base station device 40. For example, a database server referred to as a TV white space database (TVWSDB), geolocation database (GLDB), spectrum access system (SAS), or automated frequency coordination (AFC) corresponds to this device. In addition, for example, a radio wave interference control device between the base station devices 40, defined by standards represented by ETSI EN 303 387, IEEE 802.19.1-2018, and CBRSA-TS-2001, also corresponds to this device. Furthermore, for example, a Registered Location Secure Server (RLSS) defined in IEEE 802.11-2016 also corresponds to the device. That is, not limited to these examples, an entity responsible for determination and/or permission, instruction, management, and the like of the communication parameters of the base station device 40 may be referred to as the communication control device 60. Basically, the communication control device 60 has the base station device 40 as a control target, but may also control the terminals under the base station device 40.

There may be a plurality of communication control devices 60. In a case where there is a plurality of communication control devices 60, at least one of at least the following three types of decision-making topologies can be applied to the communication control device 60.

Figure 2:
FIG. 2 is a diagram illustrating an example in which a plurality of communication control devices is disposed in a distributed manner.

Autonomous decision-making
Centralized decision-making
Distributed decision-making Autonomous decision-making is a decision-making topology in which an entity that makes a decision (decision-making entity; here, communication control device) makes a decision independently from another decision-making entity. The communication control device 60 independently calculates necessary frequency allocation and interference control. This can be applied to a case, for example, where a plurality of communication control devices 60 is disposed in a distributed manner as illustrated in FIG. 2. FIG. 2 is a diagram illustrating a case where a plurality of communication control devices is disposed in a distributed manner.

Figure 3:
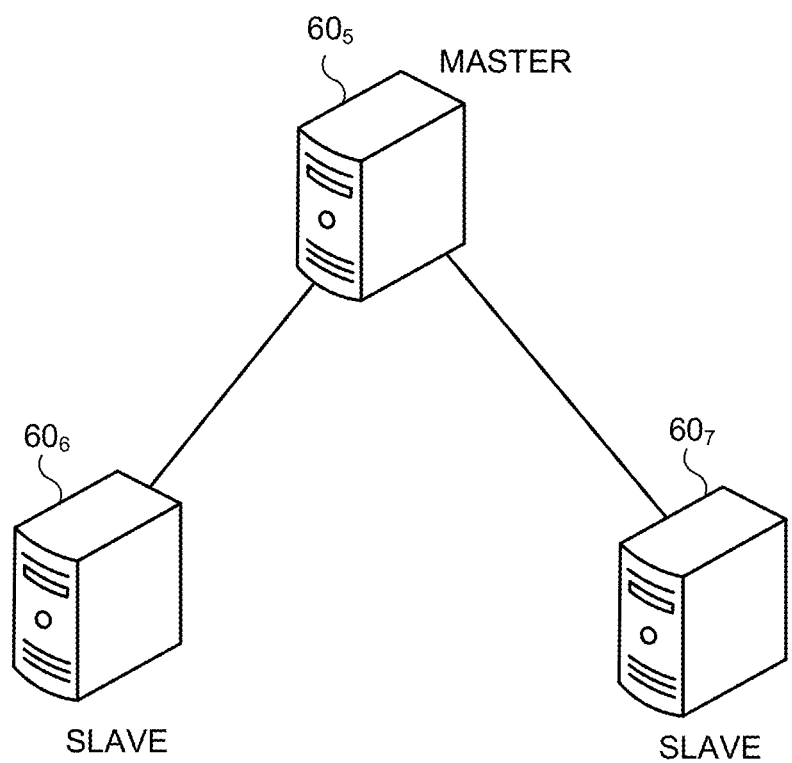
FIG. 3 is a diagram illustrating another example in which a plurality of communication control devices is disposed in a distributed manner.

Centralized decision-making is a decision-making topology in which a decision-making entity delegates decision-making to another decision-making entity. In a case where middle-sized decision-making is performed, a model as illustrated in FIG. 3 is assumed, for example. FIG. 3 is a diagram illustrating another example in which a plurality of communication control devices is disposed in a distributed manner. The diagram illustrates a model (referred to as a master-slave model) in which one communication control device 60 centrally controls a plurality of the communication control devices 60. In such a case, the communication control device 60 as a master (master communication control device 60) can integrally control the plurality of communication control devices 60 as slaves (slave communication control devices 60) to collectively make a decision.

Distributed decision-making is a decision-making topology in which a decision-making entity makes a decision in cooperation with another decision-making entity. For example, in a case where a plurality of communication control devices 60 is arranged as illustrated in FIG. 2, performing mutual adjustment, negotiation, and the like of decision-making results after each communication control device makes a decision can correspond to "distributed decision-making". Furthermore, for example, in the model as illustrated in FIG. 3, dynamically conducting, by the master communication control device 60, delegation, discarding, and the like of the decision-making authority to each slave communication control device 60 for the purpose of load balancing, and the like, can also be considered as "distributed decision-making".

Figure 4:
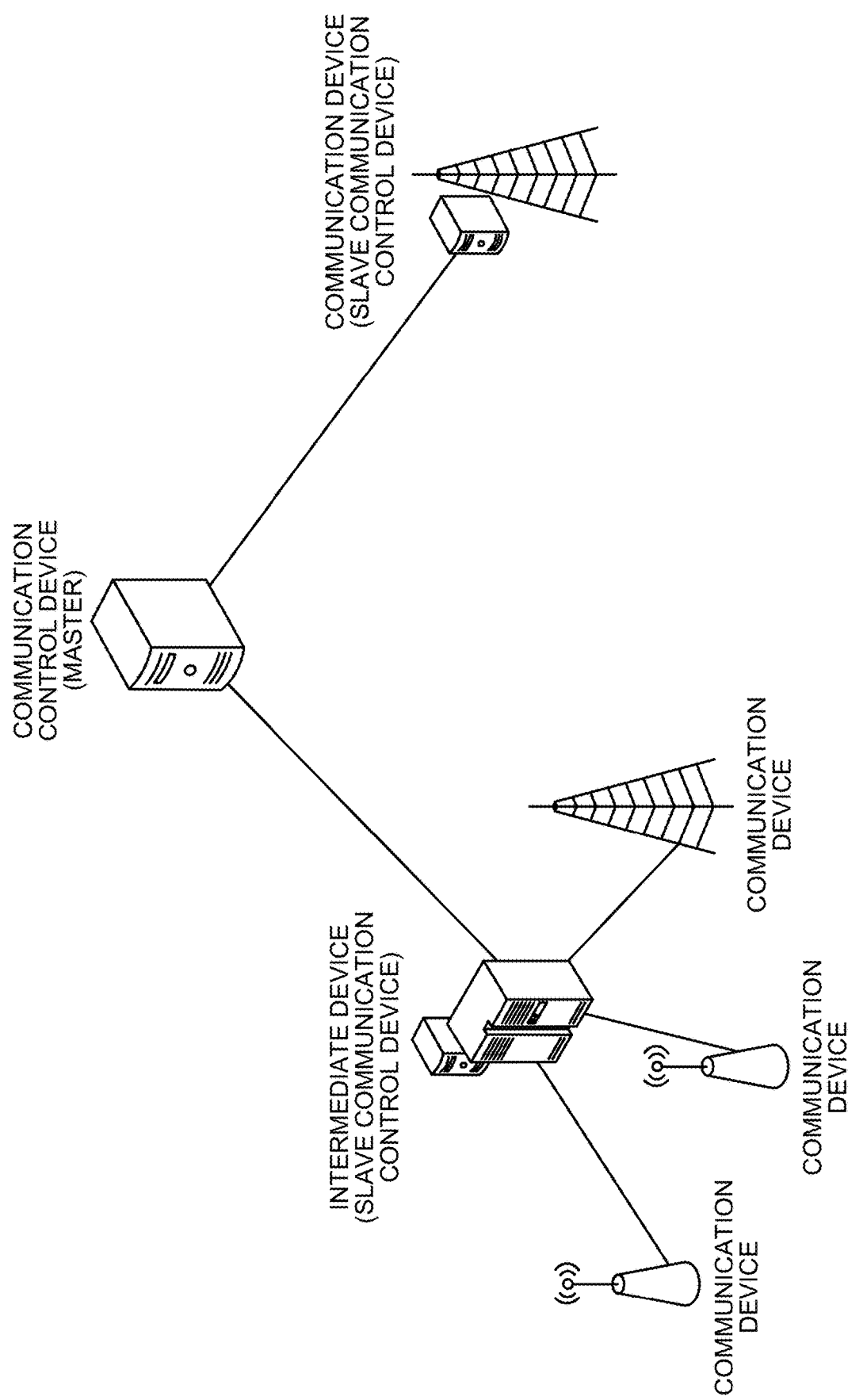
FIG. 4 is a diagram illustrating another example in which a plurality of communication control devices is disposed in a distributed manner.

In a scenario that performs application of the centralized decision-making and distributed decision-making, implementation as illustrated in FIG. 4 is also possible as a modification. FIG. 4 is a diagram illustrating another example in which a plurality of communication control devices is disposed in a distributed manner. The master communication control device may be provided outside, and a communication device or an intermediate device that bundles a plurality of communication devices may be installed to behave as a slave communication control device.

The communication control device 60 can also acquire necessary information from entities other than the base station device 40 and the terminal for achieving own functions. For example, there is a case of acquiring information necessary for protection of the primary system, from a database (regulatory database) managed and operated by a national or regional radio administration agency (National Regulatory Authority (NRA)). An example of the regulatory database is a Universal Licensing System (ULS) operated by the United States Federal Communications Commissions (FCC). Examples of information necessary for protection can include information such as location information regarding the primary system, communication parameters of the primary system, out-of-band emission limit, Adjacent Channel Leakage Ratio (ACLR), Adjacent Channel Selectivity, fading margin, and/or protection ratio (PR). For these examples, in a case where a fixed numerical value or an acquisition/derivation method is defined by a law or the like, it is desirable to use the defined values and methods.

Examples of other regulatory databases include a database for performing recording regarding the base station device 40 and the terminal that have received the conforming authentication, such as an equipment authorization system (EAS) managed by an office of engineering and technology (OET) of the FCC. From such a regulatory database, it is possible to acquire information regarding the operable frequency of the base station device 40 and the terminal, information regarding the maximum EIRP, and the like. Naturally, the communication control device 60 may use these pieces of information for protecting the primary system.

Furthermore, as another example, it is also conceivable to acquire radio wave sensing information from a radio wave sensing system installed and operated for the purpose of radio wave detection in the primary system. As a specific example, radio wave detection information regarding the in-ship radar as the primary system is acquired from a radio wave sensing system referred to as an Environmental Sensing Capability (ESC) in CBRS of the United States. Furthermore, in a case where the base station device 40 or the terminal has a sensing function, it is allowable to acquire the radio wave detection information of the primary system from these devices.

The interface between the entities may be either wired or wireless. For example, the interface between the communication control device 60 and the base station device 40 may be not only a wired line but also a wireless interface (for example, a wireless communication line provided by a mobile communication carrier via a licensed band, Wi-Fi communication using an incumbent license-exempt band, and the like) that does not depend on spectrum sharing.

Hereinafter, configurations of individual devices included in the communication system 1000, together with an external device, will be specifically described.

<1.2. Configuration of Terminal Device>

Figure 6:
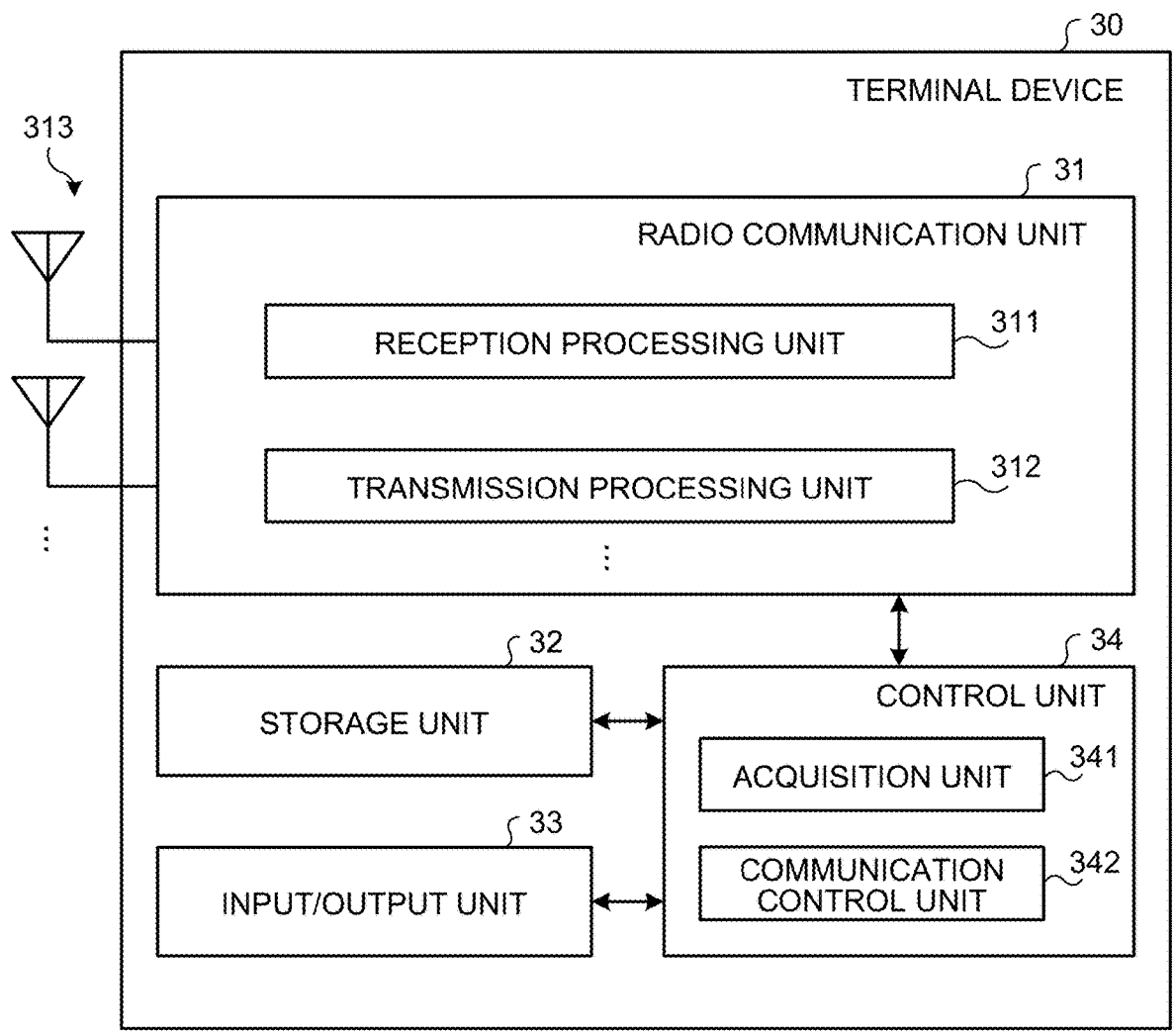
FIG. 6 is a diagram illustrating a configuration example of a terminal device according to the embodiment of the present disclosure.

Next, a configuration of the terminal device 30 will be described. FIG. 6 is a diagram illustrating a configuration example of the terminal device according to the embodiment of the present disclosure. The terminal device 30 in FIG. 6 is a communication device (radio system) that performs radio communication with the base station device 40 and/or the communication control device 60. The terminal device 30 is a type of information processing device.

The terminal device 30 includes a radio communication unit 31, a storage unit 32, an input/output unit 33, and a control unit 34. Note that the configuration illustrated in FIG. 6 is a functional configuration, and the hardware configuration may be different from this. Furthermore, the functions of the terminal device 30 may be implemented in a distributed manner in a plurality of physically separated configurations.

The radio communication unit 31 is a radio communication interface that performs radio communication with other communication devices (for example, the base station device 40 and other terminal device(s) 30). The radio communication unit 31 operates under the control of the control unit 34. The radio communication unit 31 may support one or a plurality of radio access methods. For example, the radio communication unit 31 supports both NR and LTE. The radio communication unit 31 may support other radio access methods such as W-CDMA and cdma2000.

The radio communication unit 31 includes a reception processing unit 311, a transmission processing unit 312, and an antenna 313. The radio communication unit 31 may include a plurality of the reception processing units 311, a plurality of the transmission processing units 312, and a plurality of the antennas 313. In a case where the radio communication unit 31 supports a plurality of radio access methods, individual portions of the radio communication unit 31 can be configured separately for each of the radio access methods. For example, the reception processing unit 311 and the transmission processing unit 312 may be individually configured depending on LTE and NR. The configurations of the reception processing unit 311 and the transmission processing unit 312 are similar to those of a reception processing unit 411 and a transmission processing unit 412 of the base station device 40.

The storage unit 32 is a data readable/writable storage device such as DRAM, SRAM, a flash drive, and a hard disk. The storage unit 32 functions as a storage means in the terminal device 30.

The input/output unit 33 is a user interface for exchanging information with the user. For example, the input/output unit 33 is an operation device such as a keyboard, a mouse, operation keys, and a touch panel, used by a user to perform various operations. Alternatively, the input/output unit 33 is a display device such as a liquid crystal display, or an organic electroluminescence (EL) display. The input/output unit 33 may be an acoustic device such as a speaker or a buzzer. Furthermore, the input/output unit 33 may be a lighting device such as a light emitting diode (LED) lamp. The input/output unit 33 functions as an input/output means (input means, output means, operation means, or notification means) provided on the terminal device 30.

The control unit 34 is a controller that controls individual parts of the terminal device 30. The control unit 34 is actualized by a processor such as a CPU or an MPU, for example. For example, the control unit 34 is actualized by a processor executing various programs stored in a storage device inside the terminal device 30 using RAM or the like as a work area. Note that the control unit 34 may be actualized by an integrated circuit such as an ASIC or an FPGA. The CPU, MPU, ASIC, and FPGA can all be regarded as controllers. Note that the control unit 34 may include individual functional blocks included in the control unit of the base station device 40.

As illustrated in FIG. 6, the control unit 34 includes an acquisition unit 341 and a communication control unit 342. Individual blocks (acquisition unit 341 to communication control unit 342) constituting the control unit 34 are functional blocks individually indicating functions of the control unit 34. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 34 may be configured in a functional unit different from the above-described functional block.

<1.3. Configuration of Base Station Device>

Figure 7:
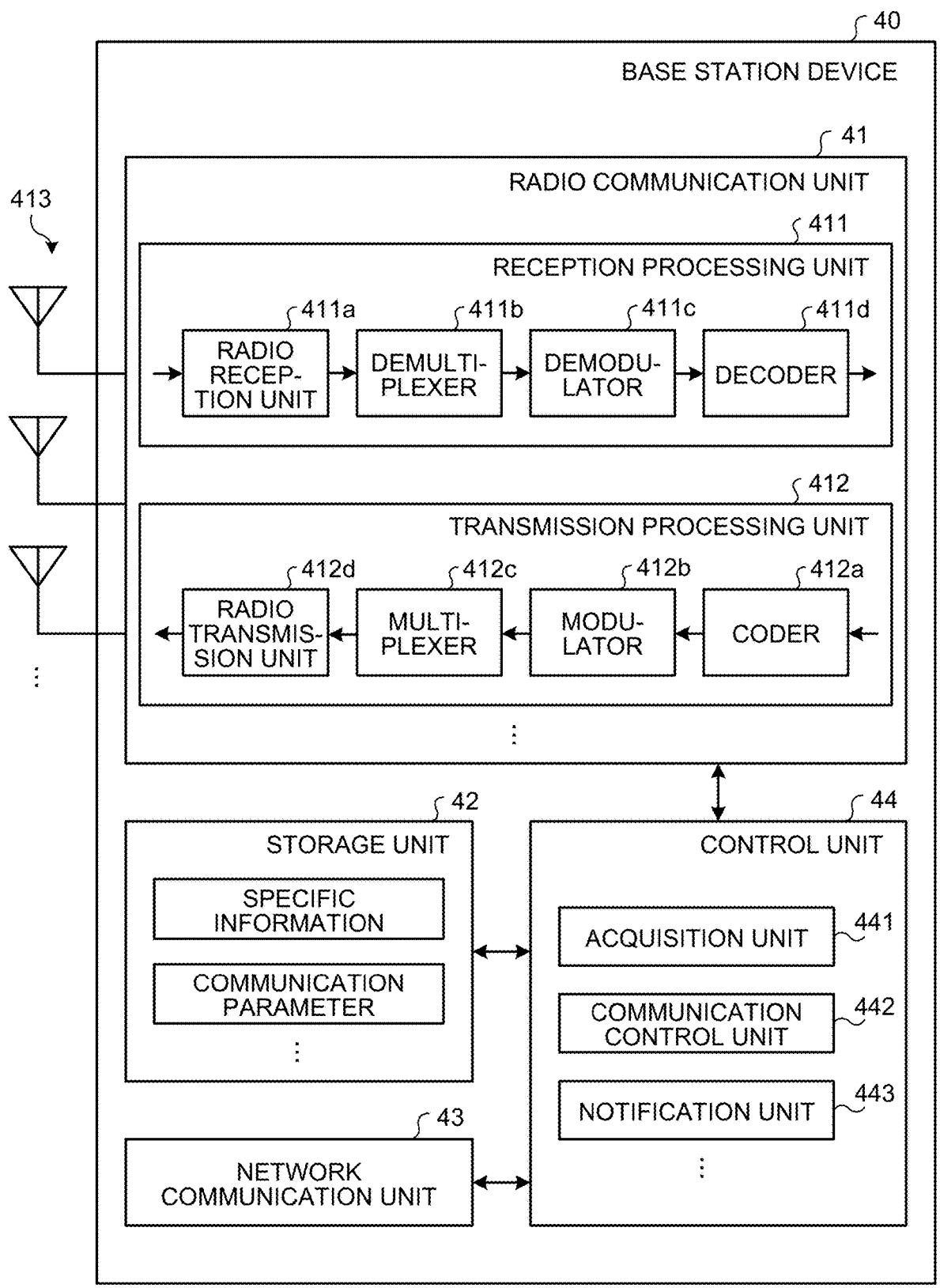
FIG. 7 is a diagram illustrating a configuration example of a base station device according to the embodiment of the present disclosure.

Next, a configuration of the base station device 40 will be described. FIG. 7 is a diagram illustrating a configuration example of the base station device according to the embodiment of the present disclosure. The base station device 40 in FIG. 7 is a communication device (radio system) that performs radio communication with the terminal device 30 under the control of the communication control device 60. The base station device 40 is a type of information processing device.

The base station device 40 includes a radio communication unit 41, a storage unit 42, a network communication unit 43, and a control unit 44. Note that the configuration illustrated in FIG. 7 is a functional configuration, and the hardware configuration may be different from this. Furthermore, the functions of the base station device 40 may be implemented in a distributed manner in a plurality of physically separated devices.

The radio communication unit 41 is a radio communication interface that performs radio communication with other communication devices (for example, the terminal device 30, the communication control device 60, the intermediate device 50, and another base station device 40). The radio communication unit 41 operates under the control of the control unit 44. The radio communication unit 41 may support a plurality of radio access methods. For example, the radio communication unit 41 may support both NR and LTE. The radio communication unit 41 may support other cellular communication methods such as W-CDMA and cdma2000. For example, the radio communication unit 41 may support the wireless LAN communication method in addition to the cellular communication method. Needless to say, the radio communication unit 41 may be configured to support a single radio access method.

The radio communication unit 41 includes a reception processing unit 411, a transmission processing unit 412, and an antenna 413. The radio communication unit 41 may include a plurality of the reception processing units 411, a plurality of the transmission processing units 412, and a plurality of the antennas 413. In a case where the radio communication unit 41 supports a plurality of radio access methods, individual portions of the radio communication unit 41 can be configured separately for each of the radio access methods. For example, if the base station device 40 is compatible with NR and LTE, the reception processing unit 411 and the transmission processing unit 412 may be configured separately for NR and LTE.

The reception processing unit 411 processes an uplink signal received via the antenna 413. The reception processing unit 411 includes a radio reception unit 411a, a demultiplexer 411b, a demodulator 411c, and a decoder 411d.

The radio reception unit 411a performs processes on the uplink signal, such as down-conversion, removal of unnecessary frequency components, amplification level control, orthogonal demodulation, conversion to digital signal, removal of guard interval, and frequency domain signal extraction using fast Fourier transform. For example, it is assumed that the radio access method of the base station device 40 is a cellular communication method such as LTE. At this time, the demultiplexer 411b demultiplexes an uplink channel such as a physical uplink shared channel (PUSCH) or a physical uplink control channel (PUCCH) and an uplink reference signal from the signal output from the radio reception unit 411a. Using a modulation scheme such as binary phase shift keying (BPSK) or quadrature phase shift keying (QPSK) for the modulation symbol of the uplink channel, the demodulator 411c demodulates the received signal. The modulation scheme used by the demodulator 411c may be multi-valued quadrature amplitude modulation (QAM) such as 16 QAM, 64 QAM, or 256 QAM. The decoder 411d performs a decoding process on the demodulated coded bits of the uplink channel. The decoded uplink data and uplink control information are output to the control unit 44.

The transmission processing unit 412 performs transmission processing of downlink control information and downlink data. The transmission processing unit 412 includes a coder 412a, a modulator 412b, a multiplexer 412c, and a radio transmission unit 412d.

The coder 412a encodes the downlink control information and the downlink data input from the control unit 44 by using a coding method such as block coding, convolutional coding, or turbo coding. The modulator 412b modulates the coded bits output from the coder 412a by a predetermined modulation scheme such as BPSK, QPSK, 16 QAM, 64 QAM, or 256 QAM. The multiplexer 412c multiplexes the modulation symbol of each of channels and the downlink reference signal and allocates the multiplexed signals on a predetermined resource element. The radio transmission unit 412d performs various types of signal processing on the signal from the multiplexer 412c. For example, the radio transmission unit 412d performs processes such as conversion to the time domain using fast Fourier transform, addition of a guard interval, generation of a baseband digital signal, conversion to an analog signal, quadrature modulation, upconvert, removal of extra frequency components, and power amplification. The signal generated by the transmission processing unit 412 is transmitted from the antenna 413.

The storage unit 42 is a data readable/writable storage device such as DRAM, SRAM, a flash drive, and a hard disk. The storage unit 42 functions as a storage means in the base station device 40. The storage unit 42 stores desired transmission power information, operational parameters, resource holding information, and the like.

The desired transmission power information is information regarding transmission power requested by the base station device 40 for information regarding transmission power necessary for transmission of radio waves, to the communication control device 60.

The operational parameter is information (for example, the setting information) related to the radio transmission operation of the base station device 40. For example, the operational parameter is information regarding the maximum value of the transmission power (maximum allowable transmission power) allowed for the base station device 40. Note that the operational parameter is not limited to the information of the maximum allowable transmission power.

In addition, the resource holding information is information related to holding of radio resources of the base station device 40. For example, the resource holding information is information of radio resources currently usable by the base station device 40. For example, the resource holding information is information regarding a holding amount of the interference margin allocated from the communication control device 60 to the base station device 40. The information regarding the holding amount may be information in units of resource blocks described below. That is, the resource holding information may be information regarding the resource block held by the base station device 40 (for example, the resource block holding amount).

The network communication unit 43 is a communication interface for communicating with other devices (for example, the communication control device 60, the intermediate device 50, and other base station devices 40). An example of the network communication unit 43 is a local area network (LAN) interface such as a Network Interface Card (NIC). The network communication unit 43 may be a universal serial bus (USB) interface including a USB host controller, a USB port, and the like. Furthermore, the network communication unit 43 may be a wired interface or a wireless interface. The network communication unit 43 functions as a network communication means of the base station device 40. The network communication unit 43 communicates with other devices under the control of the control unit 44

The control unit 44 is a controller that controls individual components of the base station device 40. The control unit 44 is actualized by a processor such as a central processing unit (CPU) or a micro processing unit (MPU), for example. For example, the control unit 44 is actualized by execution of various programs stored in the storage device inside the base station device 40 by the processor using random access memory (RAM) or the like as a work area. The control unit 44 may be actualized by an integrated circuit such as an application specific integrated circuit (ASIC) or a field programmable gate array (FPGA). The CPU, MPU, ASIC, and FPGA can all be regarded as controllers.

As illustrated in FIG. 7, the control unit 44 includes an acquisition unit 441, a communication control unit 442, and a notification unit 443. Individual blocks (the acquisition unit 441 to the notification unit 443) constituting the control unit 44 are functional blocks individually indicating functions of the control unit 44. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 44 may be configured in a functional unit different from the above-described functional block.

Note that the control unit 34 of the terminal device 30 may include individual functional blocks (the acquisition unit 441 to the notification unit 443) included in the control unit 44 of the base station device 40. In this case, the description of the "base station device 40" in the following description can be appropriately replaced with the "terminal device 30". In addition, descriptions of "control unit 44", "acquisition unit 441", "communication control unit 442", and "notification unit 443" in the following description can also be replaced with "control unit 34" as appropriate.

<1.4. Configuration of Communication Control Device>

The communication control device 60 is a device that controls radio communication of the base station device 40. The communication control device 60 may control radio communication of the terminal device 30 via the base station device 40 or directly. The communication control device 60 is a type of information processing device.

Figure 8:
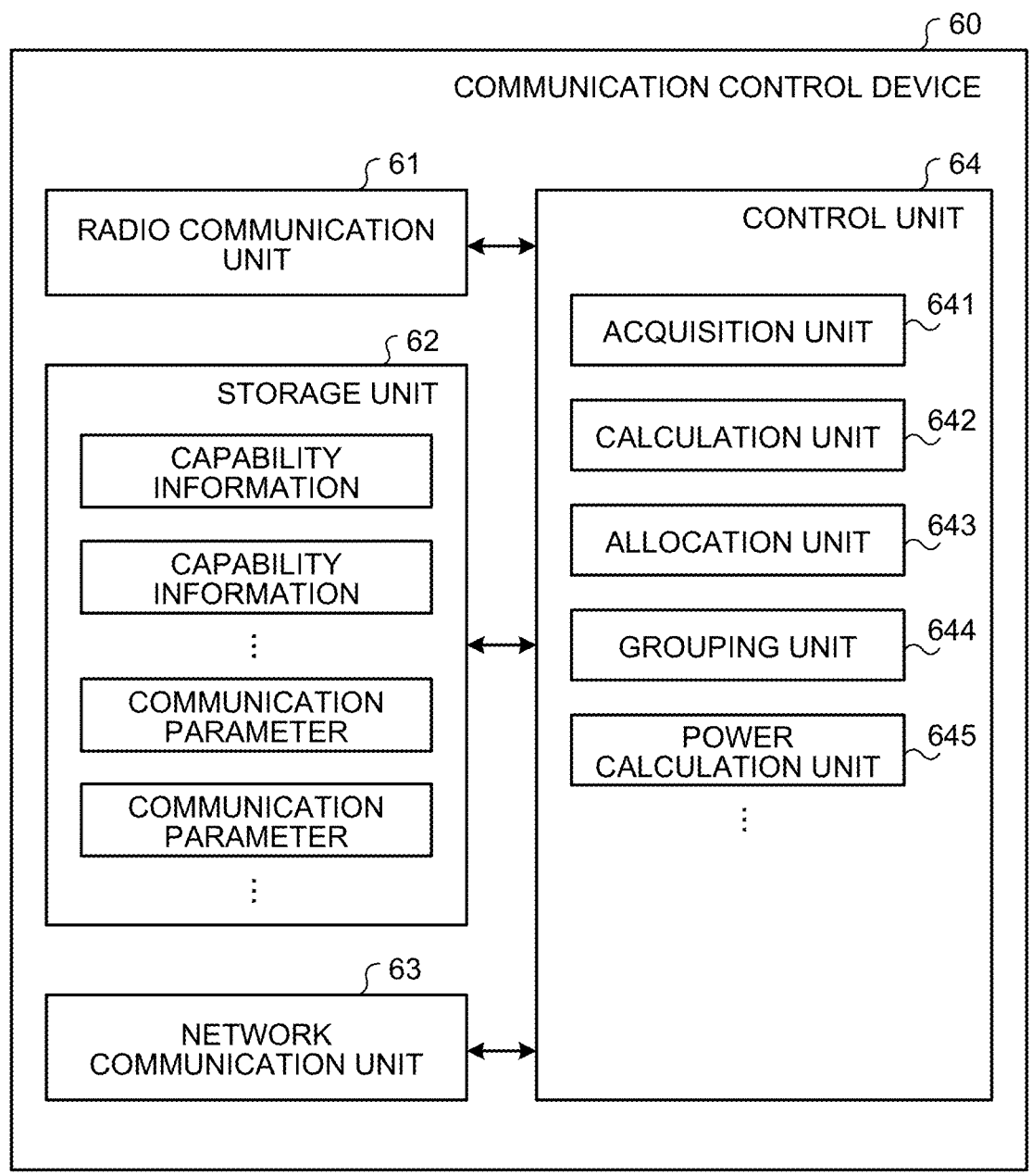
FIG. 8 is a diagram illustrating a configuration example of a communication control device according to the embodiment of the present disclosure.

FIG. 8 is a diagram illustrating a configuration example of the communication control device according to the embodiment of the present disclosure. The communication control device 60 in FIG. 8 includes a radio communication unit 61, a storage unit 62, a network communication unit 63, and a control unit 64. Note that the configuration illustrated in FIG. 8 is a functional configuration, and the hardware configuration may be different from this. Furthermore, the functions of the communication control device 60 may be implemented in a distributed manner in a plurality of physically separated configurations. For example, the communication control device 60 may be constituted with a plurality of server devices.

The radio communication unit 61 is a radio communication interface that performs radio communication with other communication devices (for example, the base station device 40, the terminal device 30, the intermediate device 50, and other communication control device(s) 60). The radio communication unit 61 operates under the control of the control unit 64. The radio communication unit 61 may support one or a plurality of radio access methods. For example, the radio communication unit 61 supports both NR and LTE. The radio communication unit 61 may support other radio access methods such as W-CDMA and cdma2000. The configuration of the radio communication unit 61 is similar to that of the radio communication unit 41 of the base station device 40.

The storage unit 62 is a data readable/writable storage device such as DRAM, SRAM, a flash drive, and a hard disk. The storage unit 62 functions as a storage means in the base station device 40. The storage unit 62 stores operational parameters of each of the plurality of base station devices 40 constituting the communication system 2. Note that the storage unit 62 may store the resource holding information of each of the plurality of base station devices 40 constituting the communication system 2. As described above, the resource holding information is information regarding holding of the radio resource of the base station device 40.

The network communication unit 63 is a communication interface for communicating with other devices (for example, the base station device 40, the intermediate device 50, and other communication control device(s) 60). The network communication unit 63 may be a network interface or a device connection interface. For example, the network communication unit 63 may be a local area network (LAN) interface such as a Network Interface Card (NIC). In addition, the network communication unit 63 may be a universal serial bus (USB) interface including a USB host controller, a USB port, and the like. Furthermore, the network communication unit 63 may be a wired interface or a wireless interface. The network communication unit 63 functions as a communication means in the communication control device 60. Under the control of the control unit 64, the network communication unit 63 communicates with the base station device 40, the terminal device 30, and the intermediate device 50.

The control unit 64 is a controller that controls individual parts of the communication control device 60. The control unit 64 is actualized by a processor such as a CPU or an MPU, for example. For example, the control unit 64 is actualized by a processor executing various programs stored in a storage device inside the communication control device 60 using RAM or the like as a work area. Note that the control unit 64 may be actualized by an integrated circuit such as an ASIC or an FPGA. The CPU, MPU, ASIC, and FPGA can all be regarded as controllers.

As illustrated in FIG. 8, the control unit 64 includes an acquisition unit 641, a calculation unit 642, an allocation unit 643, a grouping unit 644, and a power calculation unit 645. Individual blocks (the acquisition unit 641 to the power calculation unit 645) constituting the control unit 64 are functional blocks individually indicating functions of the control unit 64. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 64 may be configured in a functional unit different from the above-described functional block. The operation of individual blocks constituting the control unit 64 will be described below.

Note that the control unit 44 of the base station device 40 may include individual functional blocks (the acquisition unit 641 to the power calculation unit 645) included in the control unit 64 of the communication control device 60. In this case, the description of the "communication control device 60" in the following description can be appropriately replaced with the "base station device 40" or the "intermediate device 50". In addition, the description of "control unit 64", "acquisition unit 641", "calculation unit 642", "allocation unit 643", "grouping unit 644", and "power calculation unit 645" in the following description can also be appropriately replaced with "control unit 44" or "control unit 54".

<1.5. Terms Related to Spectrum and Sharing>

The present specification will be given assuming operation under a dynamic spectrum sharing (Dynamic Spectrum Access) environment. As a representative example, a mechanism defined in United States FCC Rule Part 96: Citizens Broadband Radio Service (hereinafter, referred to as CBRS) will be described.

Figure 5:
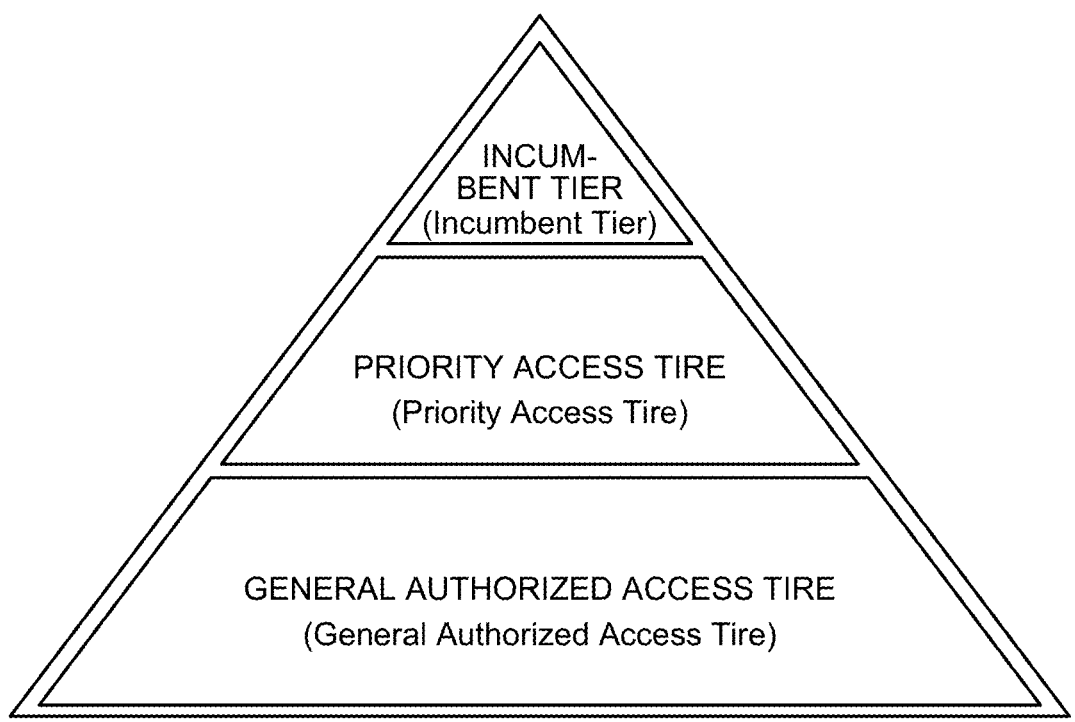
FIG. 5 is a diagram illustrating users in a shared frequency band.

FIG. 5 is a diagram illustrating users in a shared frequency band. In CBRS, as illustrated in FIG. 5, each of users in a shared frequency band is classified into one of three layers. These layers are referred to as tiers. Each of the three groups is referred to as an Incumbent Tier, a Priority Access Tier, or a General Authorized Access (GAA) Tier.

The Incumbent Tier is a group including incumbent users who conventionally use a frequency band defined as a shared frequency band. The incumbent user is also generally referred to as a primary user. The incumbent users defined in the CBRS include: the Department of Defense (DOD), fixed satellite service operators, and Grandfathered Wireless Broadband Licensees (GWBL). The Incumbent Tier is not required to avoid or suppress interference to the lower priority tiers, namely, the Priority Access Tier and the General Authorized Access Tier. On the other hand, the Incumbent Tier is protected against the interference from the Priority Access Tier and the General Authorized Access Tier. That is, the user of the Incumbent Tier can use the frequency band without considering the presence of other groups.

The Priority Access Tier is a group of users utilizing the above-described shared frequency band based on a license referred to as a Priority Access License (PAL). The user of the shared frequency band is also generally referred to as a secondary user. In the use of spectrum sharing in the Priority Access Tier, the Priority Access Tier is required to avoid or suppress interference against the Incumbent Tier having a higher priority over the Priority Access Tier. However, the Priority Access Tier is not required to implement either interference avoidance or suppression in use against the General Authorized Access Tier having a lower priority than the Priority Access Tier. In addition, the Priority Access Tier is not protected against the interference from the higher priority tier, namely, the Incumbent Tier, but is protected against the interference from the lower priority tier, namely, the General Authorized Access Tier.

The General Authorized Access Tier is a group of other shared frequency band users, not belonging to the Incumbent Tier or the Priority Access Tier Similarly, the user is also generally referred to as a secondary user. Note that, due to the lower priority in shared use compared to the Priority Access Tier, the GAA Tier user is also referred to as a low priority secondary user. In the spectrum sharing in the General Authorized Access Tier, it is required to avoid or suppress interference against the Incumbent Tier and the Priority Access Tier having higher priority. Also, the General Authorized Access Tier is not protected against interference from higher priority tiers, namely, the Incumbent Tiers and the Priority Access Tier. That is, the General Authorized Access Tier corresponds to a tier that is legislatively required to allow opportunistic shared use of spectrum.

The implementation of the present disclosure is not limited to these definitions. The CBRS typically has a three-tier structure, but may have a two-tier structure. Typical examples of this are two-tier structure including Authorized Shared Access (ASA), Licensed Shared Access (LSA), evolved LSAs (eLSAs), TV band White Space (TVWS), and the shares use of the 6 GHz band in the United States. The ASA/LSA/eLSA adopt a structure equivalent to the combination of the Incumbent Tier and the Priority Access Tier. In addition, the TVWS and the shared use of the 6 GHz band in the United States adopt a structure equivalent to a combination of the Incumbent Tier and the General Authorized Access Tier. In addition, there may be four or more tiers. For example, an intermediate layer corresponding to the Priority Access Tier may be further prioritized. In addition, for example, the General Authorized Access Tier may be similarly prioritized.

In addition, other radio systems may be set as the primary system according to the frequency band to be applied. Examples of the primary system may include radio systems such as a TV broadcast, a fixed microwave line (Fixed System (FS)), a meteorological radar, a radio altimeter, a communications-based train control, and radio astronomy. Not limited to these, any radio system may be handled as the primary system.

In addition, there is no need to be limited to the spectrum sharing environment. In a typical case of spectrum sharing or secondary utilization of spectrum, an incumbent system that uses a target band is referred to as a primary system, and a secondary user is referred to as a secondary system. However, when the present disclosure is applied to an environment other than a spectrum sharing environment, the system may be referred to as another term. For example, a macro cell base station in a heterogeneous network (HetNet) may be defined as a primary system, and a small cell base station or a relay station may be defined as a secondary system. In addition, the base station may be defined as a primary system, and a relay terminal (relay UE) or an in-vehicle terminal (vehicle UE) implementing D2D or V2X present in its coverage may be defined as a secondary system. The base station is not limited to a fixed type, and may be a portable/mobile type. In such a case, for example, the communication control device 60 provided in the present disclosure may be included in a core network, a base station, a relay station, a relay terminal, or the like.

Also, the term "spectrum" or "frequency" may be replaced by another term. For example, the term may be replaced with terms such as "resource", "resource block", "resource element", "resource pool", "channel", "component carrier", "carrier", "subcarrier", "Bandwidth Part (BWP)", or other terms having equivalent or similar meanings.

<2. Description of Various Procedures>

Here, a basic procedure applicable in the implementation of the present disclosure will be described. The description up to <2.5> will be given mainly assuming the communication device (Type A).

<2.1. Registration Procedure>

A registration procedure is a procedure of registering a device parameter related to the base station device 40 to the communication control device 60. Typically, the registration procedure is started when one or more communication systems including the base station device 40 or the plurality of base station devices 40 notify the communication control device 60 of a registration request including the device parameter.

<2.1.1. Details of Required Parameters>

The device parameter refers to the following information, for example.

Communication device user information
Information specific to communication device
Position-related information
Antenna information
Wireless interface information
Legal Information
Installer information
Communication device group information At the time of implementation, information other than these may be handled as device parameters.

The communication device user information is information related to a user of the base station device 40. Assumable examples include a user ID, an account name, a user name, a user contact, and a call sign. The user ID and the account name may be independently generated by the communication device user or may be issued in advance by the communication control device 60. Regarding the call sign, it is desirable to use a call sign issued by the NRA.

The communication device user information can be used for the purpose of interference resolution. As a specific example, there is a case where the communication control device 60 makes, in the spectrum use notification/heartbeat procedure in <2.5> to be described below, a judgment and instruction of use suspension regarding the spectrum currently used by the base station device 40, and where a spectrum use notification/heartbeat request is continuously notified even after this instruction, it is possible, with suspect of a failure of the base station device 40, to notify the user contact included in the communication device user information of a behavior confirmation request regarding the base station device 40. Not limited to this example, when it is judged that a base station device 40 is performing an operation against the communication control performed by the communication control device 60, it is possible to make a contact using communication device user information.

The information specific to the communication device includes information by which the base station device 40 can be specified, product information of the communication device, and information regarding hardware of the communication device.

The information that can specify the communication device can include, for example, a manufacturing number (serial number) of the communication device, communication device ID, and the like. The communication device ID may be uniquely assigned by the communication device user, for example.

The communication device product information may include, for example, an authentication ID, a product model number, manufacturer information, and the like. The authentication ID is ID assigned from an authentication organization in each country or region, such as an FCC ID, a CE number, and a technical standard conformity certification (technical standard), for example. This may include ID issued by an industry association or the like based on a unique authentication program.

The information specific to the communication device represented by these can be used for the purpose of whitelist/blacklist applications. For example, in a case where any piece of information corresponding to the base station device 40 in operation is included in a blacklist, the communication control device 60 can take a behavior of instructing to perform spectrum use suspension in the spectrum use notification/heartbeat procedure in <2.5> and not cancelling the use suspension measure until the blacklist is canceled. Furthermore, for example, in a case where a base station device 40 included in the blacklist performs a registration procedure, the communication control device 60 can reject the registration.

Furthermore, for example, it is also possible to perform an operation of not taking the base station device 40 corresponding to information included in a blacklist into consideration at the interference calculation described in the present specification, or operation of taking only the base station device 40 corresponding to information included in a whitelist into consideration at the interference calculation.

In this specification, the FCC ID may be handled as transmission power information. In an Equipment Authorization System (EAS) database, which is a type of regulatory database, it is possible to acquire device information that has been authenticated. The information included in this includes the FCC ID, and the maximum EIRP information for which the certification has been acquired (certified maximum EIRP). Since the power information is associated with the FCC ID, the FCC ID can be handled as the transmission power information. Similarly, the FCC ID may be handled as equivalent to other information included in the EAS. Not limited to the FCC ID, when information associated with the authentication ID is present, the authentication ID may be handled as equivalent to the information.

The information regarding the hardware of the communication device can include transmission power class information, for example. In FCC C.F.R Part 96, for example, the transmission power class information can include one of two types of defined classes, namely, Category A and Category B. Furthermore, 3GPP TS 36.104 and TS 38.104 define some classes of "eNodeB" and "gNodeB", and these can also be used as the information.

The transmission power class information may be used, for example, in an application of interference calculation. The interference calculation can be performed using the maximum transmission power defined for each class as the transmission power of the base station device 40.

The information regarding the software of the communication device can include, for example, version information, a build number, and the like regarding an execution program in which processing necessary for interaction with the communication control device 60 is described. In addition, the information may include version information, a build number, and the like of software for operating as the base station device 40.

The location-related information is typically information by which the geographical location of the base station device 40 can be specified. For example, the location information is coordinate information acquired by a positioning function represented by a global positioning system (GPS), Beidou, a Quasi-Zenith Satellite System (QZSS), Galileo, or an assisted global positioning system (A-GPS). Typically, the location information can include information regarding latitude, longitude, altitude, ground level/sea level, and positioning error. Alternatively, for example, the location information may be location information registered in an information management device managed by a National Regulatory Authority (NRA) or its agency. Alternatively, for example, it is allowable to use coordinates of an X axis, a Y axis, and a Z axis having its origin in a specific geographical location. In addition, coordinate information like this can be assigned together with an identifier indicating outdoor/indoor.

When the coordinate information is location-related information, positioning accuracy information (location uncertainty) may be included. For example, both or either of a horizontal plane and a vertical plane may be provided. For example, the positioning accuracy information (location uncertainty) may be used as a correction value when calculating a distance to a certain point.

Furthermore, the location-related information may be information indicating an area in which the base station device 40 is located. For example, it is allowable to use information defined by the government, such as a postal code and a postal address. Furthermore, for example, the area may be indicated by a set of three or more geographic coordinates. The information indicating these regions may be provided together with the coordinate information.

Furthermore, in a case where the base station device 40 is located indoors, information indicating a floor of a building may be added to the location-related information. For example, it is allowable to add an identifier or the like indicating floor number or ground/underground. Furthermore, it is allowable to add information indicating a further closed space inside the building, such as a room number and a room name in the building, for example.

Typically, the above-described positioning function is desirably provided in the base station device 40. However, it is not always possible to acquire the location information satisfying required accuracy depending on the performance of the positioning function or the installation position. Therefore, the positioning function may be used by the installer. In such a case, the location information measured by the installer is to be desirably written in the base station device 40.

The antenna information is typically information indicating performance, a configuration, and the like of an antenna included in the base station device 40. Typically, for example, the antenna information can include information such as an antenna installation height, a tilt angle (Downtilt), a horizontal direction (Azimuth), an aim (Boresight), an antenna peak gain, and an antenna model.

The antenna information can also include information regarding a formable beam. For example, it is allowable to include information such as a beamwidth, a beam pattern, and an analog/digital beamforming capability.

In addition, the antenna information can also include information related to performance and a configuration of Multiple Input Multiple Output (MIMO) communication. For example, information such as the number of antenna elements and the maximum number of spatial streams can be included. In addition, the antenna information can include codebook information to be used, weight matrix information (a unitary matrix obtained by singular value decomposition (SVD), eigen value decomposition (EVD), block diagonalization (BD), or the like, a zero-forcing (ZF) matrix, or a minimum mean square error (MMSE) matrix), and the like. In addition, when equipped with Maximum Likelihood Detection (MLD) or the like that requires nonlinear calculation, information indicating the MLD or the like may be included.

The antenna information may include Zenith of Direction, Departure (ZoD). The ZoD is a type of radio wave arrival angle. The ZoD may be estimated by another base station device 40 based on the radio wave radiated from the antenna of the base station device 40. In this case, the base station device 40 may be a terminal device that operates as a base station or an access point, a device that performs D2D communication, a moving relay base station, or the like. The ZoD can be estimated by a radio wave arrival direction estimation technology such as Multiple Signal Classification (MUSIC) or Estimation of Signal Propagation via Rotation Invariance Techniques (ESPRIT). This information can be used as measurement information by the communication control device 60.

The wireless interface information is typically information indicating a wireless interface technology included in the base station device 40. For example, the wireless interface information includes identifier information indicating a technology used in GSM (registered trademark), CDMA2000, UMTS, E-UTRA, E-UTRA NB-IoT, 5G NR, 5G NR NB-IoT or technologies used in further next generation cellular system, derivative technologies based on LTE/5G, such as MulteFire or LTE-Unlicensed (LTE-U), NR-Unlicensed (NR-U), or standard technologies such as a Metropolitan Area Network (MAN) such as WiMAX or WiMAX2+, or a wireless LAN based on IEEE 802.11. This information may be an identifier indicating XGP or sXGP. This may be an identifier of a communication technology for LPWA. This may be identifier information indicating a proprietary radio technology. In addition, it is also possible to add a version number or a release number of the technical specification that defines the information like this.

The wireless interface information can also include frequency band information supported by the base station device 40. For example, the information can be expressed by one or more combinations of the upper limit frequency and the lower limit frequency, one or more combinations of the center frequency and the bandwidth, one or more 3GPP Operating Band numbers, and the like.

The frequency band information supported by the base station device 40 can further include information indicating capability regarding bandwidth extension technology such as carrier aggregation (CA) and channel bonding. For example, combinable band information or the like can be included. Furthermore, the carrier aggregation can also include information regarding a band to be used as a primary component carrier (PCC) or a secondary component carrier (SCC). Also, the number of CCs that can be aggregated at the same time can be included.

The frequency band information supported by the base station device 40 may further include combination information of frequency bands supported by Dual Connectivity (DC) or Multi Connectivity (MC). In addition, information regarding other base station devices 40 that cooperatively provide Dual Connectivity and Multi Connectivity may be provided together. The communication control device 60 may make a judgment the communication control disclosed in the present disclosure in consideration of another base station device 40 having a cooperative relationship or the like in the subsequent procedures.

The frequency band information supported by the base station device 40 may also include information indicating radio wave utilization priority such as PAL and GAA.

The wireless interface information can also include modulation scheme information supported by the base station device 40. For example, as a representative example, the wireless interface information can include information indicating a primary modulation scheme such as frequency shift keying (FSK), n-value phase shift keying (PSK) (n is a multiplier of 2, such as 2, 4, and 8), or n-value quadrature amplitude modulation (QAM) (n is a multiplier of 4, such as 4, 16, 64, 256 and 1024), or information indicating a secondary modulation scheme such as orthogonal frequency division multiplexing (OFDM), Scalable OFDM, DFT spread OFDM (DFT-s-OFDM), Generalized Frequency Division Multiplexing (GFDM), or Filter Bank Multi Carrier (FBMC).

The wireless interface information can also include information related to an error correction code. For example, the information can include capabilities regarding a turbo code, a low density parity check (LDPC) code, a polar code, and an erasure correction code, as well as coding rate information to be applied.

The modulation scheme information and the information related to the error correction code can also be expressed by a Modulation and Coding Scheme (MCS) index as another aspect.

In addition, the wireless interface information can also include information indicating functions specific to each of radio technology specifications supported by the base station device 40. For example, there is transmission mode (TM) information defined in LTE, as a representative example. In addition, information having two or more modes with respect to a specific function can be included in the wireless interface information as in the TM described above. In addition, in a case where, in the technical specification, the base station device 40 supports a function that is not essential in the specification even in the absence of two or more modes, information indicating this function can also be included.

The wireless interface information can also include radio access method (radio access technology (RAT)) information supported by the base station device 40. For example, the wireless interface information can include information indicating: an orthogonal multiple access (OMA) scheme such as time division multiple access (TDMA), frequency division multiple access (FDMA), or orthogonal frequency division multiple access (OFDMA); a non-orthogonal multiple access (NOMA) scheme such as Power Division Multiple Access ((PDMA) which is represented by techniques implemented by combining Superposition Coding (SPC) and Successive Interference Canceller (SIC)), Code Division Multiple Access (CDMA), Sparse Code Multiple Access (SCMA), Interleaver Division Multiple Access (IDMA), and Spatial Division Multiple Access (SDMA); and opportunistic access schemes such as Carrier Sense Multiple Access/Collision Avoidance (CSMA/CA) and Carrier Sense Multiple Access/Collision Detection (CSMA/CD).

When information indicating an opportunistic access scheme is included in the wireless interface information, information indicating details of the access scheme may be further included. As a specific example, information indicating which one of Frame Based Equipment (FBE) and Load Based Equipment (LBE) defined in ETSI EN 301 598 may be included.

When the wireless interface information described above indicates LBE, information specific to LBE, such as Priority Class defined in ETSI EN 301 598, may be further included.

In addition, the wireless interface information can also include information regarding a duplex mode supported by the base station device 40. As a representative example, information regarding schemes such as frequency division duplex (FDD), time division duplex (TDD), and full duplex (FD) can be included.

In a case where TDD is included as the wireless interface information, TDD Frame Configuration information used/supported by the base station device 40 can be added. Furthermore, information regarding the duplex mode may be included for each frequency band indicated by the frequency band information described above.

When the FD is included as the wireless interface information, information related to an interference power detection level may be included.

The wireless interface information can also include information related to a transmission diversity method supported by the base station device 40. For example, Space Time Coding (STC) or the like may also be included.

The wireless interface information can also include guardband information. For example, information related to a standard guardband size can be included. Alternatively, for example, information regarding a guardband size desired by the base station device 40 may be included.

The wireless interface information may be provided for each frequency band regardless of the above-described aspect.

The legal information typically corresponds to information related to regulations that the base station device 40 must comply with, which are defined by radio administration agencies in different countries and regions or equivalent organizations, authentication information acquired by the base station device 40, and the like. The information regarding the regulation typically includes, for example, upper limit value information of out-of-band emission, information regarding a blocking characteristic of the receiver, and the like. Typically, the authentication information can include, for example, type approval information (FCC ID, Technical Standard Conformance Certificate, and the like), legal/regulatory information (for example, FCC regulation number, ETSI Harmonized Standard number, and the like) to be a standard for authentication acquisition, and the like.

Among the legal information, information related to a numerical value may be substituted by information defined in the specification of the wireless interface technology. For example, the upper limit value of the out-of-band emission may be derived for application by using an Adjacent Channel Leakage Ratio (ACLR) instead of the upper limit value information of the out-of-band emission. In addition, the ACLR itself may be used as necessary. Furthermore, adjacent channel selectivity (ACS) may be used instead of the blocking characteristic. In addition, these may be used in combination, or an adjacent channel interference ratio (ACIR) may be used. In general, ACIR has a relationship with ACLR and ACS as in the following.

$$ACIR = \left(\frac{1}{ACS} + \frac{1}{ACLR}\right)^{-1} \quad (1)$$

Note that although true value expression is used for the number expression, logarithmic expression may be used.

The installer information can include information capable of specifying a person who installs the base station device 40 (installer), specific information associated with the installer, and the like. Typically, the information can include information related to a person responsible for the location information of the base station device 40, which is Certified Professional Installer (CPI) defined in Non Patent literature [3]. For example, Certified Professional Installer Registration ID (CPIR-ID) and a CPI name are disclosed as the information. In addition, for example, a postal address (mailing/contact address), an e-mail address, a telephone number, a Public Key Identifier (PKI), and the like are disclosed as specific information associated with CPI. The information is not limited thereto, and other information related to the installer may be included as necessary.

The communication device group information can include information related to a communication device group to which the base station device 40 belongs. For example, the information can include information related to the same or equivalent type of group as disclosed in Literature "WINNF-SSC-0010". Furthermore, for example, in a case where a network operator manages the base station device 40 in units of groups based on its own operation policy, the group information can be included.

Figures 9, 10:
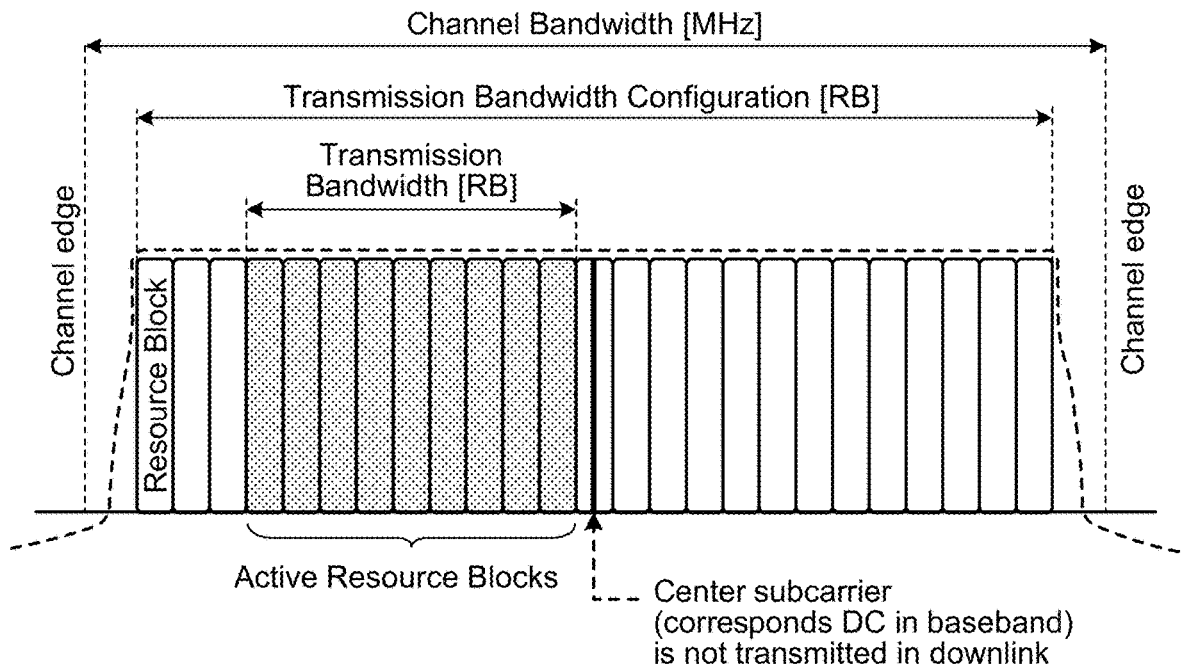
FIG. 9 is a diagram illustrating specifications of a transmission bandwidth in E-UTRA.
FIG. 10 is a diagram illustrating specifications of a transmission bandwidth in E-UTRA.
Figures 11, 12:
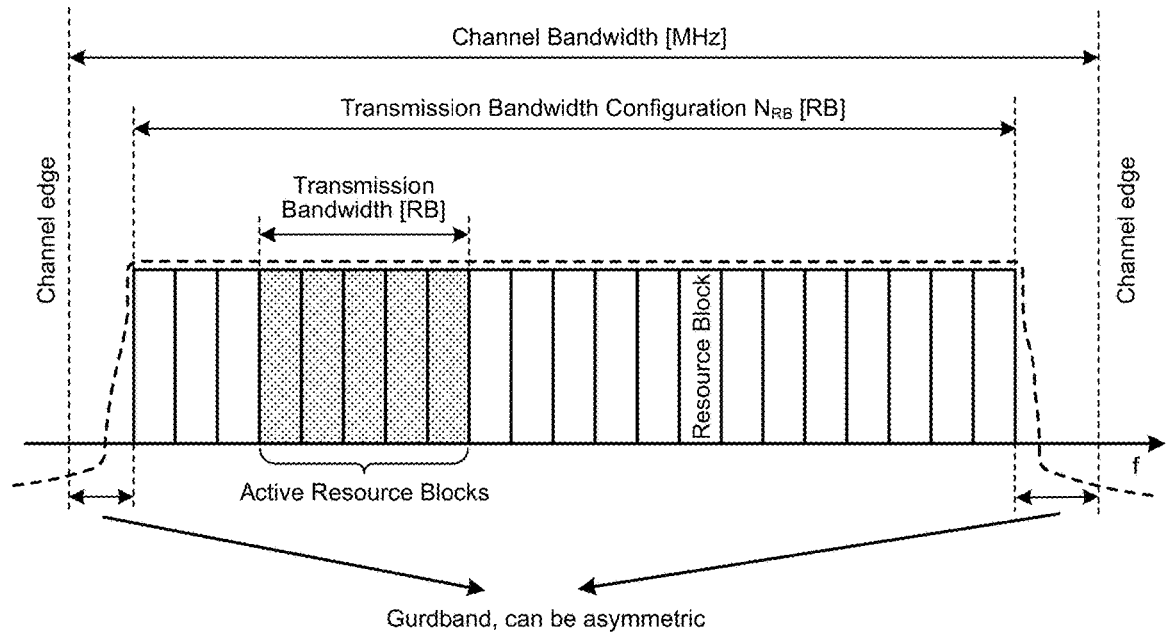
FIG. 11 is a diagram illustrating specifications of a transmission bandwidth in NR.
FIG. 12 is a diagram illustrating specifications of a transmission bandwidth in NR.

The information listed so far need not be provided by the base station device 40 to the communication control device 60 but may be estimated by the communication control device 60 from other information provided from the base station device 40. For example, the guardband information can be estimated from the wireless interface specification information. FIGS. 9 to 14 are diagrams illustrating specifications of the transmission bandwidth. FIGS. 9 and 10 are diagrams illustrating transmission bandwidth specifications in E-UTRA. FIGS. 11, 12, 13, and 14 are diagrams illustrating specifications of a transmission bandwidth in NR.

In other words, the base station device 40 or an intermediate device (for example, a network manager) that substitutes for the plurality of base station devices 40 does not necessarily need to provide the information listed so far to the communication control device 60. Providing information to the communication control device 60 by the base station device 40 or an intermediate device that substitutes for the plurality of base station devices 40 is merely one means of information provision. The information listed so far represents information that can be necessary for the communication control device 60 to normally complete the present procedure, and any means for providing the information may be used. For example, the Literature "WINNF-TS-0016" and Literature "WINNF-TS-0061 (referred to as Multi-Step Registration)" permit such a method.

Naturally, the information listed so far is selectively applicable according to the legal system and technical specifications.

<2.1.1.1. Supplement to Required Parameters>

In the registration procedure, depending on the embodiment, it is assumed that not only the base station device 40 but also the device parameters related to the terminal are required to be registered in the communication control device 60. In such a case, the term "communication device" in the above description (details of required parameters) may be replaced with a term "terminal" or an equivalent term for application. In addition, a parameter specific to the "terminal" that is not described above (details of required parameters) may also be handled as a required parameter in the registration procedure. An example of this is a User Equipment (UE) category defined in 3GPP.

<2.1.2. Details of Registration Process>

The base station device 40 or one or more communication systems including a plurality of the base station devices 40 generate a registration request message using the device parameter, and then notify the communication control device 60 of the generated registration request message.

Here, in a case where the device parameter includes installer information, falsification prevention processing or the like may be performed on the registration request by using this information. In addition, a part or all of the information included in the registration request may be subjected to an encryption process. For example, it is possible to apply a process in which a public key specific to the installer is shared in advance between the installer and the communication control device 60, and the installer performs encryption on information using a secret key. Examples of the encryption target include security sensitive information such as location information.

As disclosed in Non Patent Literature [3], the installer may directly write the location information into the communication control device 60, for example.

After receiving the registration request, the communication control device 60 performs a registration process regarding the base station device 40, and returns a registration response according to a processing result. When there is no lack or abnormality of information necessary for registration, the communication control device 60 records the information to the storage unit and notifies normal completion. Otherwise, a registration failure is notified. In a case of normal completion of registration, the communication control device 60 may assign an ID to each base station device 40 and may notify the communication device of the ID information by enclosing the ID information at the time of response. In a case of a registration failure, typically, one or more communication systems including the base station device 40 or a plurality of the base station devices 40, or an operator (for example, a mobile network operator or an individual) or an installer thereof performs correction or the like of the registration request, and attempts the registration procedure until normal completion of the registration.

Note that the registration procedure is sometimes executed a plurality of times. For example, when the location information is changed beyond a predetermined standard due to movement of the device, accuracy improvement, or the like, the registration procedure can be executed again. The predetermined standard is typically defined by a legal system. For example, in 47 C.F.R Part 15, the Mode II personal/portable white space device is required to access the database again when the location information changes by 100 meters or more.

<2.2. Available Spectrum Query Procedure>

The available spectrum query procedure is a procedure used by the base station device 40 or the communication system representing a plurality of the base station devices 40 to make a query about information regarding the available spectrum to the communication control device 60. Typically, the procedure is started when the base station device 40 or the communication system representing the plurality of base station devices 40 notifies the communication control device 60 of a query request including information by which the base station device 40 can be specified.

Here, typically, the available spectrum information is information indicating a spectrum that can be safely provided as a secondary use without giving fatal interference to the primary system by the base station device 40.

(1)

The available spectrum information is determined based on a secondary use prohibited area referred to as an exclusion zone, for example. Specifically, in a case where the base station device 40 is installed in a secondary use prohibited area provided for the purpose of protecting the primary system using the frequency channel F1, for example, the frequency channel F1 is not notified as an available channel to the base station device 40.

(2)

The available spectrum information can also be determined by the degree of interference given to the primary system, for example. For example, when it is judged that fatal interference might be given to the primary system even outside the secondary use prohibited area, the frequency channel would not be notified as an available channel in some cases. An example of a specific calculation method is described in "Details of available spectrum evaluation process" described below.

(3)

Moreover, in the available spectrum information, there can also be frequency channels not to be notified as available channels because of conditions other than the primary system protection requirements described in (1) and (2) above. Specifically, in order to previously avoid interference that can occur between the base station devices 40, for example, a frequency channel being used by another base station device 40 existing in the neighborhood of the base station device 40 might not be notified as an available channel in some cases. In this manner, the available spectrum information set in consideration of interference with other base station devices 40 may be set as "recommended spectrum information" for example, and may be provided together with the available spectrum information. That is, the "recommended spectrum information" is desirably a subset of the available spectrum information.

(4)

Even in a case corresponding to the situation described in (2) and (3) above, the spectrum same as that of the primary system or the neighboring base station device 40 can be notified as an available channel. In such a case, typically, the maximum allowable transmission power information is included in the available spectrum information. The maximum allowable transmission power is typically expressed by Equivalent Isotropic Radiated Power (EIRP). The power is not necessarily limited to this, and may be provided by a combination of conducted power and antenna gain, for example. Furthermore, the antenna gain may have an allowable peak gain set for each spatial direction.

<2.2.1. Details of Required Parameters>

Examples of assumable information by which the communication device can be specified include information specific to the communication device registered at the time of the registration procedure, and the ID information described in <2.1.2>.

The query request can also include query requirement information. The query requirement information can include, for example, information indicating a frequency band availability of which is desired to be obtained. Also, for example, transmission power information can be included. The communication device or the communication system representing the plurality of communication devices can include transmission power information, for example, when it is desired to know only frequency information that enables use of desired transmission power. The query requirement information does not necessarily need to be included.

The query request can also include a measurement report. The measurement report includes a result of measurement performed by the communication device and/or the terminal. The report can include not only raw data but also processed information, for example. For example, it is possible to use standardized metrics represented by Reference Signal Received Power (RSRP), Reference Signal Strength Indicator (RSSI), and Reference Signal Received Quality (RSRQ).

<2.2.2. Details of Available Spectrum Evaluation Process>

After receiving the query request, evaluation of the available spectrum is performed based on the query requirement information. For example, as described in (1) to (3) of the "Available Spectrum Query Procedure" above, the available spectrum can be evaluated in consideration of the existence of the primary system, the secondary use prohibited area thereof, and the communication device in the neighborhood.

The communication control device 60 may calculate the secondary use prohibited area. For example, when the maximum and minimum transmission power is defined, a separation distance can be calculated as follows.

$$PL^{-1}(P_{MaxTx}-I_{Th}) \le d < PL^{-1}(P_{MinTx}-I_{Th}) \qquad (2)$$

With this operation, the spectrum availability can be determined according to the positional relationship between the primary system and the base station device 40. Furthermore, in a case where transmission power information (or power range information) desired to be used by the base station device 40 is supplied in response to a request, the spectrum availability can be determined by calculating $PL^{-1}$ $(P_{MinTx}-I_{Th})$ and comparing the result with the range expression.

Calculation is performed using the allowable interference power information of the primary system, the calculation reference point information of the interference power level experienced by the primary system, the registration information of the base station device 40, and the propagation loss estimation model. The maximum transmission power (assuming the same channel) at the position of the base station device 40 is calculated by the following formula as an example.

$$P_{MaxTx}=I_{Th}+PL(d) \qquad (3)$$

In this case, the maximum transmission power available on the channel in use by the primary system is $P_{MaxTx}$. By taking ACRL and the out-of-band emission maximum value into consideration, the calculation can be similarly performed for the adjacent channel.

The maximum allowable transmission power information may be derived as described in (4) of the "available spectrum query procedure". Typically, the maximum allowable transmission power is calculated by using allowable interference power information in the primary system or its protection zone, calculation reference point information of an interference power level experienced by the primary system, registration information of the base station device 40, and a propagation loss estimation model. As an example, the power can be calculated by the following mathematical expression.

$$P_{MaxTx}=I_{Th}+PL(d) \qquad (4)$$

Here, $P_{MaxTx}$ is maximum allowable transmission power (dBm), $I_{Th}$ is allowable interference power (dBm), d is a distance between the reference point and the base station device 40, and PL(d) is a propagation loss (dB) at the distance d. Although the antenna gain in the transceiver is not explicitly indicated in the mathematical expression, the antenna gain may be included according to a method of expressing the maximum allowable transmission power (EIRP, conducted power, etc.) or a reference point for the reception power (antenna input point, antenna output point, and the like). Furthermore, a safety margin or the like for compensating for variation due to fading may also be included. In addition, feeder loss and the like may be taken in consideration as necessary. By taking ACRL and the out-of-band emission maximum value into consideration, the calculation can be similarly performed for the adjacent channel.

In addition, the above mathematical expression is described based on the assumption that the single base station device 40 is an interference source (single station interference). For example, in a case where it is necessary to consider aggregated interference from a plurality of base station devices 40 at the same time, a correction value may be added. For example, the correction value can be determined based on three types (Fixed/Predetermined, Flexible, and Flexible Minimized) of interference margin methods disclosed in Non Patent Literature [4].

Note that the allowable interference power information is not necessarily directly available as in the above mathematical expression. For example, when a required signal to interference plus noise ratio (SINR) or SIR of the primary system is available, these may be converted into allowable interference power and used. Such conversion processing may be applied not only to this process but also to processes of other procedures.

Note that, although the above mathematical expression is expressed using logarithms, the mathematical expression may naturally be converted into a true number to be used at the time of implementation. In addition, all parameters in logarithmic notation described in the present specification may be appropriately converted into base numbers and used.

Furthermore, in a case where the transmission power information described in "Details of required parameters" above is included in the query requirement information, the available spectrum can be evaluated by a method different from the above-described method. For example, in an exemplary case where it is assumed that desired transmission power indicated by transmission power information is used and when an estimated interfering amount is less than the allowable interference power in the primary system or its protection zone, it is judged that the frequency channel is available, and the base station device 40 is notified of the information.

The above is an example in which the band use condition is calculated based on the other system related information, and the present disclosure is not limited to such an example. For example, similarly to an area of a radio environment map (REM), in a case where an area/space in which the base station device 40 can use the shared band is determined in advance, the available spectrum information may be derived based on only the location-related information and the height-related information. Furthermore, for example, in a case where a lookup table associating a position and a height with available spectrum information is prepared, the available spectrum information may also be derived based on only the location-related information and the height-related information.

Furthermore, in a case where the communication control device 60 has recognized information regarding capability of a bandwidth extension technology such as carrier aggregation (CA) or channel bonding as frequency band information supported by the base station device 40, information such as available combination and a recommended combination information may be further included in the available spectrum information.

In a case where the communication control device 60 has recognized frequency band combination information supported by Dual Connectivity and Multi Connectivity as the frequency band information supported by the base station device 40, information of available frequencies and recommended frequencies for Dual Connectivity and Multi Connectivity may be included.

In a case where the imbalance of the maximum allowable transmission power occurs between the plurality of frequency channels when the available frequency information is provided for the band extension technology as described above, the information may be provided after adjustment. For example, from the viewpoint of primary system protection, it is allowable to make an adjustment to the lower side of the maximum allowable power flux density (or Power Spectral Density (PSD)).

The evaluation of the available spectrum does not necessarily need to be performed after reception of the query request. For example, after the normal completion of the above-described registration procedure, the communication control device 60 may proactively perform the procedure without any query request. In such a case, it is also allowable to create the above-described REM, lookup table, or an information table similar to these.

In any method, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, as disclosed in Non Patent Literature [3], in a case where information regarding the base station device 40 (referred to as Cluster List in WINNF-TS-0112) that performs high priority use (for example, PAL) is registered in the communication control device 60 in advance by the user, evaluation may be performed based on the information.

In addition, in any of the above calculations, when the location information of the base station device 40 is used, the spectrum availability may be determined by performing correction regarding the location information and the coverage using the positioning accuracy information (location uncertainty).

After the evaluation of the available spectrum is completed, the communication control device 60 notifies the base station device 40 of the evaluation result.

The base station device 40 may select a desired communication parameter by using the evaluation result received from the communication control device 60.

<2.3. Spectrum Grant Procedure>

The spectrum grant procedure is a procedure needed for the base station device 40 to receive secondary use grant of a spectrum from the communication control device 60. Typically, after normal completion of the registration procedure, one or more communication systems including the base station device 40 or the plurality of base station devices 40 notify the communication control device 60 of a spectrum grant request including information by which the base station device 40 can be specified, thereby starting the procedure. Note that "after normal completion of the registration procedure" also implies that the available spectrum query procedure does not necessarily need to be performed.

Depending on the legal system, the spectrum grant procedure is not necessarily performed. TVWS does not use the spectrum grant basically. The CBRS uses a mechanism of the spectrum grant. The procedures may be selectively used depending on the legal system.

The spectrum grant is useful for calculation of aggregated interference described below. Accordingly, it is allowable to employ a method of adopting the spectrum grant when the aggregated interference calculation is necessary and not adopting the spectrum grant when the aggregated interference calculation is not necessary. This judgment may be made at the time of designing a mechanism based on the present specification, or may be dynamically determined by the communication control device 60 during actual operation.

In the present disclosure, it is assumed that at least the following two types of spectrum grant request method are usable.

Designation Method

Flexible Method

The designation method is a request method in which the base station device 40 designates at least a frequency channel desired to be used and the maximum transmission power as desired communication parameters and requests the communication control device 60 to permit operation based on the desired communication parameters. The parameters are not necessarily limited to these parameters, and parameters specific to the wireless interface technology (such as a modulation scheme and a duplex mode) may be designated. In addition, information indicating radio wave utilization priority such as PAL and GAA may be included in the parameter.

The flexible method is a request method in which the base station device 40 designates only a requirement regarding a communication parameter and requests the communication control device 60 to designate a communication parameter that can achieve secondary use grant while satisfying the requirement. A requirement for a communication parameter can include bandwidth or a desired maximum transmission power or a desired minimum transmission power. The parameters are not necessarily limited to these parameters, and parameters specific to the wireless interface technology (such as a modulation scheme and a duplex mode) may be designated. For example, one or more pieces of TDD frame setting information may be selected in advance and notified.

In any manner, a measurement report may be included in the request. The measurement report includes a result of measurement performed by the base station device 40 and/or the terminal. The report can include not only raw data but also processed information, for example. For example, it is possible to use standardized metrics represented by Reference Signal Received Power (RSRP), Reference Signal Strength Indicator (RSSI), and Reference Signal Received Quality (RSRQ).

The scheme information used by the base station device 40 may be registered in the communication control device 60 at the time of the registration procedure described in the above "Registration procedure".

<2.3.1. Details of Spectrum Grant Process>

After receiving the spectrum grant request, the communication control device 60 performs spectrum grant process based on the spectrum grant request method. For example, using the method described in <2.2.>, it is possible to perform the spectrum grant process in consideration of the primary system and its secondary use prohibited area, the presence of the base station device 40 in the neighborhood, and the like.

When the flexible method is used, the maximum allowable transmission power information may be derived using the method described in <2.2.2>. Typically, the maximum allowable transmission power is calculated by using allowable interference power information in the primary system or its protection zone, calculation reference point information of an interference power level experienced by the primary system, registration information of the base station device 40, and a propagation loss estimation model. Specifically, the information can be calculated by the above-described Formula (4). Although the antenna gain in the transceiver is not explicitly indicated in Formula (4), the mathematical expression may be transformed according to a method of expressing the maximum allowable transmission power (EIRP, conducted power, etc.) or a reference point for the reception power (antenna input point, antenna output point, and the like). Furthermore, a safety margin or the like for compensating for variation due to fading may also be included. In addition, feeder loss and the like may be taken in consideration as necessary.

In addition, the above mathematical expression is described based on the assumption that the single base station device 40 is an interference source. For example, in a case where it is necessary to consider aggregated interference from a plurality of base station devices 40 at the same time, a correction value may be added. For example, the correction value can be determined based on three types of method (Fixed/Predetermined, Flexible, and Flexible Minimized) disclosed in the literature "ECC Report 186".

Various models can be used as the propagation loss estimation model. When a model is designated for each application, it is desirable to use the designated model. For example, in WINNF-TS-0112, a propagation loss model such as Extended Hata (eHATA) or Irregular Terrain Model (ITM) is adopted for each application. Naturally, the propagation loss model does not need to be limited thereto at implementation of the present disclosure.

The propagation loss estimation model requires radio wave propagation path information depending on the model. This may include, for example, information indicating presence or absence of line of sight (LOS/NLOS), terrain information (undulations, sea levels, etc.), environmental information (Urban, Suburban, Rural, Open Sky, etc.), and the like. In using the propagation loss estimation model, these pieces of information may be estimated from the registration information regarding the base station device 40 or information regarding the primary system. Alternatively, when there is a pre-designated parameter, it is desirable to use the pre-designated parameter for that item.

In a predetermined application, when a model is not designated, the model may be selectively used as necessary. As a specific example, for example, it is possible to selectively use models in such a way as to use a model that calculates the loss as low such as a free space loss model when estimating the interfering power to another base station device 40 and use a model that calculates the loss as high when estimating the coverage of the base station device 40.

In addition, in a case where the designation method is used, as an example, the spectrum grant process can be performed by evaluating the interference risk. Specifically, in an exemplary case where it is assumed that desired transmission power indicated by transmission power information is used and when an estimated interfering amount is less than the allowable interference power in the primary system or its protection zone, it is judged that the use of the frequency channel can be allowed, and the base station device 40 is notified of the information.

In any method, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, in a case where information regarding the communication device (referred to as Cluster List in literature WINNF-TS-0112) that performs high priority use (for example, PAL) is registered in the communication control device 60 in advance by the user, evaluation may be performed based on the information.

In addition, in any of the above calculations, when the location information of the communication device is used, the spectrum availability may be determined by performing correction of the location information and the coverage using the positioning accuracy information (location uncertainty).

The spectrum grant process does not necessarily have to be performed when the spectrum grant request is received. For example, after normal completion of the registration procedure described above, the communication control device 60 may proactively perform the spectrum grant process without any spectrum grant request. Furthermore, for example, the spectrum grant determination process may be performed at regular intervals. In such a case, it is allowable to create the REM and the lookup table illustrated in the above-described "Available spectrum query procedure" or an information table similar to these tables. That is, the communication control device 60 can quickly return a response after receiving the spectrum grant request.

<2.4. Spectrum Use Notification/Heartbeat>

The spectrum use notification/heartbeat is a procedure in which the base station device 40 or the communication system representing the plurality of base station devices 40 notifies the communication control device 60 of the spectrum use based on the communication parameter allowed to be used in the spectrum grant procedure. This is also referred to as a heartbeat. Typically, the procedure is started when the base station device 40 or the communication system representing the plurality of base station devices 40 notifies the communication control device 60 of a notification message including information by which the base station device 40 can be specified.

This procedure is desirably performed periodically until the use of the spectrum is rejected from the communication control device 60. After this procedure is normally completed, the base station device 40 may start or continue radio transmission. For example, when the state of the grant indicated Granted, the state of the grant transitions to Authorized as a result of the success of this procedure. In addition, when the state of the grant indicated Authorized, failure of this procedure causes the state of the grant to transition to Granted or Idle.

Here, the grant is authorization for radio transmission given by the communication control device 60 (for example, SAS) to the base station device 40 (for example, CBSD). The grant is described in Non Patent Literature 1 "WINNF-TS-0016-V1.2.4", for example. According to Non Patent Literature 1, a signaling protocol between a database (SAS) and a base station (CBSD) for spectrum sharing of 3550-3700 MHz in the United States is standardized. In this standard, the authorization for radio transmission given by SAS to CBSD is referred to as a "grant". The operational parameters permitted in the grant are defined in two parameters, namely, maximum allowable equivalent isotropic radiated power (EIRP) and a frequency channel. That is, in order to perform radio transmission using a plurality of frequency channels, CBSD needs to acquire a plurality of grants from SAS.

The grant has defined states indicating radio transmission permission states. Examples of the states indicating the radio transmission permission states include a Granted state and an Authorized state. The Granted state indicates a state of holding a grant but being prohibited from performing radio transmission, while the Authorized state indicates a state in which radio transmission is permitted based on an operational parameter value defined in the grant. These two states transition according to a result of a heartbeat procedure defined in the same standard.

In the following description, the spectrum use notification/heartbeat will be sometimes referred to as a heartbeat request or simply a heartbeat. In addition, a transmission interval of a heartbeat request may be referred to as a heartbeat interval. Note that the description of a heartbeat request or a heartbeat in the following description can be appropriately replaced with another description indicating "a request for starting or continuing radio transmission". Similarly, the heartbeat interval can also be replaced with another description (for example, the transmission interval) indicating the transmission interval of the spectrum use notification/heartbeat.

After receiving the spectrum use notification/heartbeat, the communication control device 60 may determine whether the start/continuation of the radio transmission is permitted. Examples of the determination method include confirmation of the spectrum use information of the primary system. Specifically, the start/continuation permission or refusal for the radio transmission can be determined based on a change in the spectrum used by the primary system, a change in the status of spectrum used by the primary system with no steady use of radio waves (for example, in-ship radar), or the like.

In the present procedure, a communication parameter reconfiguration command may be issued from the communication control device 60 to the base station device 40. Typically, the reconfiguration command can be executed in response to the spectrum use notification/heartbeat. For example, recommended communication parameter information can be provided. The base station device 40 to which the recommended communication parameter information has been provided desirably performs the spectrum grant procedure again using the recommended communication parameter information.

<2.5. Supplement to Various Procedures>

The various procedures do not necessarily need to be individually implemented as described below. For example, the two different procedures may be implemented by substituting a third procedure with the roles of the two different procedures. For example, the registration request and the available spectrum information query request may be integrally notified. Furthermore, for example, the spectrum grant procedure and the spectrum use notification/heartbeat may be integrally performed. It is of course allowable to set the number of combinations to three or more, not limited to these combinations. Furthermore, the above procedure may be separately performed.

In addition, the expression of "acquiring information" or an expression equivalent thereto in the present specification does not necessarily mean that the information is acquired precisely following the procedure described above. For example, even with a description that the location information of the communication device is used in the available spectrum evaluation process, it means it is not always necessary to use the information acquired in the registration procedure. For example, when the location information is included in the available spectrum query procedure request, the location information may be used. In other words, this means that the described parameters may be included in other procedures within the scope described in the present specification and within the scope of technical feasibility.

Furthermore, information that can be included in the response from the communication control device 60 to the base station device 40 described in the procedure may be notified by push notification. As a specific example, available spectrum information, recommended communication parameter information, radio transmission continuation/refusal notification, and the like may be notified by push notification.

<2.6. Various Procedures Related to Terminal>

Hereinabove, the description has been made assuming mainly the communication device (Type A). However, in some embodiments, there is an assumable scenario in which communication parameters are under management of the communication control device 60, that is, communication parameters are determined by the communication control device 60 not only for the communication device (Type A) but also for the terminal and the communication device (Type B) including the terminal. Even in such a case, it is basically possible to use each procedure described in "registration procedure" to "spectrum use notification/heartbeat" described above. However, unlike the communication device (Type A), the terminal and the communication device (Type B) need to use the spectrum managed by the communication control device 60 for the backhaul link, and cannot perform radio transmission without permission. Therefore, it is desirable to start backhaul communication for the purpose of accessing the communication control device 60 only after the detection of a radio wave or an authorization signal transmitted by the serving communication device or the master communication device.

On the other hand, under the management of the communication control device 60, it is conceivable to set allowable communication parameters for the purpose of primary system protection also in the terminal and the communication device (Type B). However, the communication control device 60 has no prior knowledge of location information and the like regarding these devices. These devices are also likely to have mobility. That is, the location information is dynamically updated. Depending on the legal system, when the change in the location information is a certain level or more, re-registration to the communication control device 60 would be required in some cases.

In consideration of these various use modes of terminal and communication devices, in an operation mode of TVWS defined by the Office of Communication (Ofcom), the following two types of communication parameters are defined.

Generic Operational Parameters
Specific Operational Parameters

The generic operational parameters are communication parameters defined as "parameters usable by any slave WSD located within the coverage area of a predetermined master WSD (corresponding to the communication device)" in the Non Patent Literature. The parameter is characterized by being calculated by the WSDB without using the location information of the slave WSD.

The generic operational parameters can be provided by unicast/broadcast from the base station device 40 that is already permitted to perform radio transmission by the communication control device 60. For example, a broadcast signal represented by Contact Verification Signal (CVS) defined in FCC rule Part 15 Subpart H can be used for providing the information. Alternatively, the information may be provided by a broadcast signal specific to a wireless interface. This enables the generic operational parameters to be handled as communication parameters to be used by the terminal or the communication device (Type B) in radio transmission for the purpose of accessing the communication control device 60.

The specific operational parameters are communication parameters defined as "parameters that can be used by a specific slave White Space Device (WSD)" in the Non Patent Literature. In other words, the parameter is a communication parameter calculated by using the device parameter of the slave WSD corresponding to the terminal. The parameter is characterized by being calculated by a White Space Database (WSDB) using the location information of the slave WSD.

<2.7. Procedure Occurring Between Communication Control Devices>

<2.7.1. Information Exchange>

The communication control device 60 can exchange management information with another communication control device 60. At least the following information is desirably exchanged:

Information Related to Communication Device
Area Information
Protection Target System Information The information related to the communication device includes at least registration information and communication parameter information regarding the communication device operating under permission of the communication control device 60. Registration information of a communication device that having no permitted communication parameter may be included.

The communication device registration information is typically a device parameter of the base station device 40 to be registered in the communication control device 60 in the registration procedure. There is no need to exchange all the registered information. For example, there is no need to exchange information that might correspond to personal information. Furthermore, when the communication device registration information is exchanged, information that has undergone encryption or obfuscation may be exchanged. For example, information converted into a binary value or information signed using an electronic signature mechanism may be exchanged.

Typically, the communication device communication parameter information is information related to a communication parameter currently used by the base station device 40. It is desirable that the information includes at least information indicating the spectrum being used and the transmission power. The information may include other communication parameters.

The area information is typically information indicating a predetermined geographical zone. The information can include zone information of various attributes in various modes.

For example, the information may include protection zone information of the base station device 40 to be a high priority secondary system such as PAL Protection Area (PPA) disclosed in Literature (WINNF-TS-0112). The area information in this case can be expressed by a set of three or more geolocation coordinates, for example. Furthermore, for example, in a case where a plurality of communication control devices 60 can refer to a common external database, the information can be expressed by an ID indicating the information.

Furthermore, the information may include information indicating the coverage of the base station device 40, for example. The area information in this case can also be expressed by a set of three or more geolocation coordinates, for example. Furthermore, for example, the information can also be expressed by information indicating a radius size when assuming a circle having its origin in the geographical location of the base station device 40. Furthermore, for example, in a case where a plurality of communication control devices 60 can refer to a common external database that records area information, the information can be expressed by an ID indicating the information.

Furthermore, as another aspect, the area information can include information regarding an area section determined in advance by the government or the like. For example, it is possible to indicate a certain region by indicating a postal address. Furthermore, for example, a license area or the like can be similarly expressed.

Furthermore, as still another aspect, the area information does not necessarily have to express a planar area, and may express a three-dimensional space. For example, it may be expressed using a spatial coordinate system. In addition, for example, information indicating a predetermined closed space, such as a floor number, a floor, or a room number of a building, may be used.

Protection target system information is, for example, information regarding a radio system handled as Incumbent. Examples of the situation in which this information needs to be exchanged include cross-border coordination. It is highly conceivable that there are different Incumbent systems in the same band between adjacent countries and regions. Furthermore, even with an Incumbent operating the same radio system, it is not always possible to acquire Incumbent information of an adjacent country or region. In such a case, the protection target system information can be exchanged as necessary between communication control devices 60 in different countries and regions to which the systems belong.

As another aspect, the protection target system information can include information regarding a secondary licensee and a radio system operated under the secondary license. The secondary licensee is specifically the lessee of the license, and for example, it is assumed that the secondary licensee uses a leased PAL from the owner and operates a radio system owned by the secondary licensed person. In a case where the communication control device independently performs lease management, the communication control device 60 can exchange information regarding the secondary licensee and a radio system operated under the secondary license with another communication control device 60 for the purpose of protection.

These pieces of information can be exchanged between the communication control devices 60 regardless of the decision-making topology applied to the communication control device 60.

In addition, these pieces of information can be exchanged in various methods. Example of methods will be described below.

ID Designation Method
Period Designation Method
Zone Designation Method
Dump Method The ID designation method is a method of acquiring information corresponding to an ID assigned in advance to specify information managed by the communication control device 60 by using the ID. For example, it is assumed that a communication control device 1A manages a base station device 40 with ID: AAA. At this time, a communication control device 1B designates the ID: AAA and makes an information acquisition request to the communication control device 1A. After receiving the request, the communication control device 1A searches for information of ID: AAA, and notifies the registration information and the communication parameter information of the corresponding base station device 40 as a response.

The period designation method in which a specific period is designated and information satisfying a predetermined condition can be exchanged during the period.

Examples of the predetermined condition include the presence or absence of information update. For example, in a case where acquisition of communication device information in a specific period is designated by a request, registration information regarding the base station device 40 newly registered in the period, registration information of the base station device 40 whose communication parameter has been changed, and information regarding the communication parameter, can be notified as a response.

Examples of the predetermined condition include whether the communication control device 60 has performed recording. For example, in a case where acquisition of the communication device information in a specific period is designated by the request, the registration information of the base station device 40 and the information of the communication parameter recorded by the communication control device 60 in the specific period can be notified as a response. Furthermore, the latest information in the period can be notified. Alternatively, the update history may be notified for each piece of information.

The zone designation method is a method of designating a specific zone, and exchanging information belonging to the zone. For example, in a case where acquisition of communication device information in a specific zone is designated by a request, registration information regarding the base station device 40 installed in the zone and information regarding a communication parameter can be notified as a response.

The dump method is a method of providing all information recorded by the communication control device 60. At least information and area information regarding the base station device 40 are desirably provided by the dump method.

All the above description of the information exchange between the communication control devices 60 is based on a pull method. That is, information exchange is performed in a mode in which information corresponding to the parameter designated in the request is given as a response, and can be implemented by the HTTP GET method as an example. However, the present invention is not limited to the pull method, and information may be actively provided to another communication control device 60 by a push method. The push method can be implemented by the HTTP POST method, as an example.

<2.7.2. Command/Request Procedure>

The communication control device 60 may exchange a command or a request with each other. A specific example of this is reconfiguration of communication parameters of the base station device 40. For example, when it is judged that the communication device managed by the communication control device 1A is experiencing a large amount of interference from a communication device 1C managed by the communication control device 1B, the communication control device 1A may request the communication control device 1B to change the communication parameter of the communication device 1C.

Another example is reconfiguration of area information. For example, when incompletion is found in calculation of the coverage information and the protection zone information regarding the communication device 1C managed by the communication control device 1B, the communication control device 1A may request the communication control device 1B to reconfigure the area information. Besides this, the area information reconfiguration request may be made for various reasons.

<2.8. Information Transmission Means>

Signaling between the entities described above can be implemented via various types of media. The case of E-UTRA or 5G NR will be described as an example. As a matter of course, the embodiment is not limited to these.

<2.8.1. Signaling Between Communication Control Device and Communication Device>

The notification from the base station device 40 to the communication control device 60 may be performed in an application layer, for example. For example, the hyper text transfer protocol (HTTP) may be used for notification. Signaling can be performed by describing required parameters in a message body of the HTTP according to a predetermined format. Furthermore, in the case of using HTTP, notification from the communication control device 60 to the base station device 40 is also performed according to the HTTP response mechanism.

<2.8.2. Signaling Between Communication Device and Terminal>

The notification from the base station device 40 to the terminal device may be performed by using at least a part of any of radio resource control (RRC) signaling, system information (SI), or downlink control information (DCI), for example. Additionally, the notification may be implemented by using at least a part of any of downlink physical channels (including Physical Downlink Control Channel (PDCCH), Physical Downlink Shared Channel (PDSCH), Physical Broadcast Channel (PBCH), NR-PDCCH, NR-PDSCH, and NR-PBCH).

The notification from the terminal device to the base station device 40 may be performed by using a part of RRC signaling or using Uplink Control Information (UCI), for example. Additionally, the notification may be implemented by using uplink physical channels (including Physical Uplink Control Channel (PUCCH), Physical Uplink Shared Channel (PUSCH), or Physical Random Access Channel (PRACH).

The signaling is not limited to the physical layer signaling described above, and the signaling may be performed in a higher layer. For example, at the time of implementation in the application layer, signaling may be implemented by describing a required parameter in a message body of HTTP according to a predetermined format.

<2.8.3. Terminal-to-Terminal Signaling>

Figure 15:
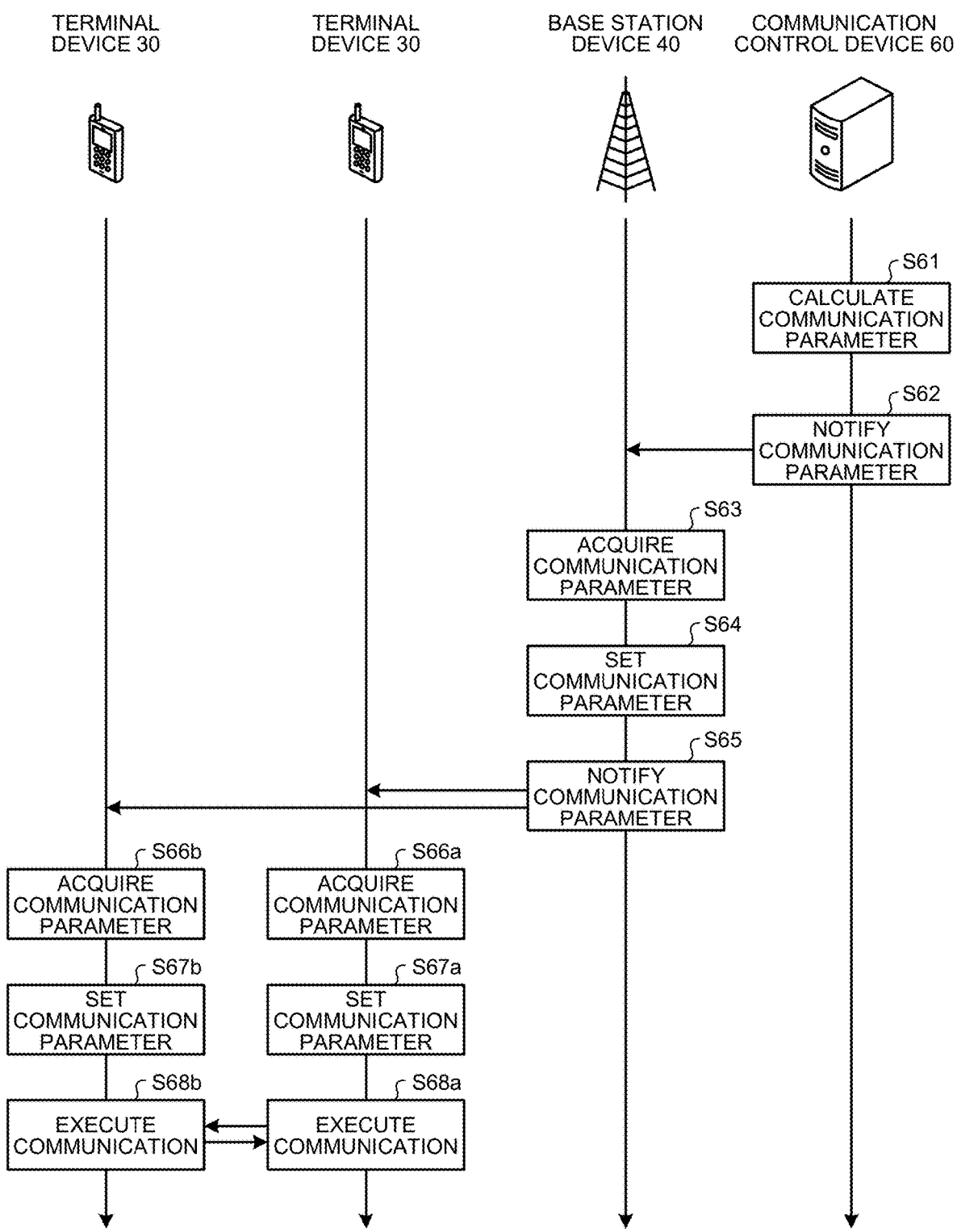
FIG. 15 is a diagram illustrating an example of a signaling procedure according to a communication system of the present disclosure.

FIG. 15 illustrates an example of a signaling procedure in a case where terminal-to-terminal communication, device-to-device (D2D), and vehicle-to-everything (V2X) are assumed as a secondary system communication. FIG. 15 is a diagram illustrating an example of a signaling procedure according to a communication system of the present disclosure. The terminal-to-terminal communication, D2D, and V2X may be performed using a physical sidelink channel (Physical Sidelink Control Channel (PSCCH), Physical Sidelink Shared Channel (PSSCH), or Physical Sidelink Broadcast Channel (PSBCH).

When a target frequency channel for spectrum sharing is used in the sidelink, the communication parameter may be notified, acquired, and configured in association with a sidelink resource pool in the target frequency channel. The resource pool is a sidelink radio resource set by a specific frequency resource (for example, a resource block, a component carrier, or the like) and a time resource (for example, a radio frame, a subframe, a slot, a mini-slot, or the like). In a case where the resource pool is set in the frequency channel to be subjected to spectrum sharing, the resource pool is set by at least one of RRC signaling, system information, or downlink control information from the base station device 40 to the terminal device. In addition, the communication parameters to be applied in the resource pool and the sidelink are also set by at least one of RRC signaling, system information, or downlink control information from the base station device 40 to the terminal device. The notification of the setting of the resource pool and the notification of the communication parameter to be used in the sidelink may be performed simultaneously or individually.

<3. Configuration of Proposed System>

Embodiments of the present disclosure will be described. The proposed system includes a base station device 40 and a communication control device 60. The base station device 40 provides a secondary communication service, which is a communication service using at least a part of a frequency band used by a primary communication service, which is a ship radar system of the United States of America, for example. In the proposed system, one or more base station devices 40 are disposed. The communication control device 60 permits the base station device 40 to use the frequency band of the primary communication service.

3.1. First Embodiment

Figure 16:
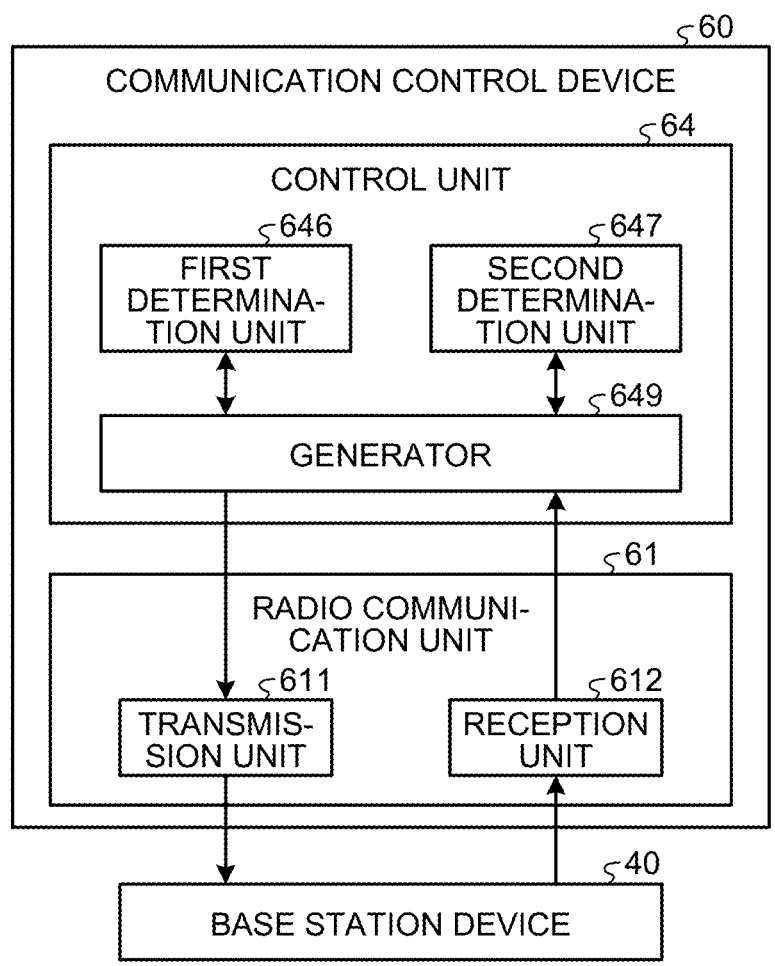
FIG. 16 is a diagram illustrating a configuration example of a communication control device according to a first embodiment of the present disclosure.

FIG. 16 is a diagram illustrating a configuration example of a communication control device according to a first embodiment of the present disclosure. FIG. 16 is a diagram illustrating a configuration example of the communication control device 60, which is a diagram depicting only the control unit 64 and the radio communication unit 61 in the communication control device 60 illustrated in FIG. 8. The control unit 64 of the communication control device 60 in FIG. 16 further includes a first determination unit 646, a second determination unit 647, and a generator 649. Furthermore, the radio communication unit 61 includes a transmission unit 611 and a reception unit 612. The configuration of the communication control device 60 other than these is similar to that of the communication control device 60 in FIG. 8, and thus the description thereof is omitted. Incidentally, FIG. 16 includes an illustration of the base station device 40.

The reception unit 612 receives a radio wave from devices such as the base station device 40 which is a secondary use communication device. The reception unit 612 receives a request for using at least a part of the frequency band in the primary communication service from the base station device 40.

The transmission unit 611 transmits a radio wave to the base station device 40 and the like. The transmission unit 611 transmits a response generated by a generator 649 to be described below.

The first determination unit 646 makes a judgment related to the use of the frequency band allocated to the primary communication service and generates a response according to the judgment result. Based on the judgment, the first determination unit 646 determines (performs decision making of) whether or not to allow the base station device 40 to use the above-described frequency band, and generates a response reflecting that effect. The response generated by the first determination unit 646 is referred to as a first response. The first determination unit 646 can make a judgment based on the protection of the primary communication service against the use of the above-described frequency band by the base station device 40, for example. The protection of the primary communication service corresponds to the protection against interference when the base station device 40 uses the frequency band, for example.

The second determination unit 647 generates a response including information regarding use of the above-described frequency band in a base station device group including a plurality of the base station devices 40. The second determination unit 647 generates a response based on the judgment result of the first determination unit 646. The second determination unit 647 may generate a response when the first determination unit 646 permits use of the frequency band. The response generated by the second determination unit 647 is referred to as a second response. The information related to the use of the frequency band in a base station device group of the second response corresponds to, for example, setting information suitable for radio wave use in the base station device group.

The generator 649 generates a response based on the first response and the second response described above. The response generated by the generator 649 is transmitted via the transmission unit 611 to the base station device 40 that has requested the use of the frequency band. The generator 649 may generate a first response including a second response. That is, the generator 649 can generate the response by including the second response in the first response.

On the other hand, in order to perform the secondary use communication service using the frequency band allocated to the primary communication service, the base station device 40 transmits a request for using at least a part of the above-described frequency band to the communication control device 60. This transmission is performed by the transmission processing unit 412 described with reference to FIG. 7. Further, the base station device 40 receives: a first response according to a result of the judgment related to the use of the frequency band based on the transmitted request; and a second response including information related to the use of the frequency band in the base station device group determined based on the judgment. This reception is performed by the reception processing unit 411 in FIG. 7. The base station device 40 can perform the secondary use communication service based on the received first response and second response. Note that the transmission processing unit 412 is an example of a transmission unit described in the claims. The reception processing unit 411 is an example of a reception unit described in the claims.

In this manner, the generator 649 generates and transmits a response based on the first response and the second response. This makes it possible to prevent a conflict between the first response and the second response, and possible to prevent overwriting of the response of the second determination unit 647 over the response of the first determination unit 646. This leads to prevention of the hindrance of the function of the first determination unit 646. In addition, by transmitting the first response including the second response, the procedure can be simplified as compared with a case where the first response and the second response are separately transmitted.

3.2. Second Embodiment

The above first embodiment has described the communication control device 60 to which the technology according to the present disclosure is applied. A second embodiment will describe a communication control device 60 having a SAS function.

Figure 17:
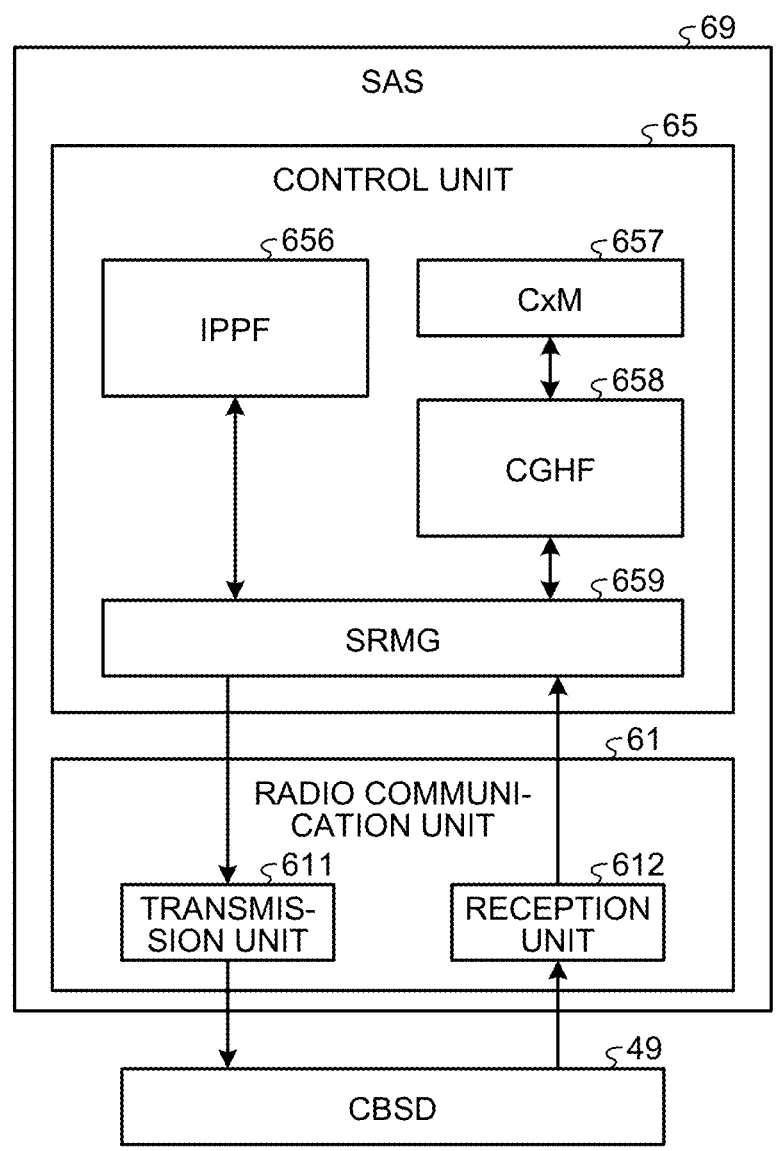
FIG. 17 is a diagram illustrating a configuration example of a communication control device according to a second embodiment of the present disclosure.

FIG. 17 is a diagram illustrating a configuration example of a communication control device according to the second embodiment of the present disclosure. FIG. 17 is a diagram illustrating a configuration example of an SAS 69 which is a communication control device having an SAS function. The SAS 69 of FIG. 17 is different from the communication control device 60 of FIG. 16 in that a control unit 65 is provided instead of the control unit 64. The control unit 65 includes an Incumbent/PAL Protection Function (IPPF) 656, a CxM 657, and a CBSD Group handling function (CGHF) 658. The control unit 65 further includes a SAS response message generator (SRMG) 659. The IPPF 656 corresponds to the first determination unit 646 in FIG. 16. The CxM 657 corresponds to the second determination unit 647 in FIG. 16. The SRMG 659 corresponds to the generator 649 in FIG. 16. The SAS 69 of FIG. 17 makes a judgment of a request for use of a frequency band from a CBSD 49 which is the base station device 40.

The IPPF 656 is a functional block that determines the use of the frequency band based on the protection of the Incumbent Tier (Incumbent) or the Priority Access Tier (PAL). The IPPF 656 generates the first response. This first response can use a first response code formed with response codes corresponding one-to-one to the plurality of responses. The first response code can be formed with a three-digit number, for example. In addition, the first response code may be classified into a response code group, which is grouped for each similar response among the plurality of responses. Details of the first response code will be described below.

The CxM 657 is referred to as a coexistence manager (CxM), and is an entity having a manager function that is responsible for coexistence between base station devices of the General Authorized Access Tier (GAA) or between base station devices of a Priority Access Tier. The CxM 657 generates the second response. Similarly to the first response, the second response can use a second response code formed with response codes as well. Similarly to the first response code, the second response code can also be formed with a three-digit number. Similarly to the first response code, the second response code may be classified into a response code group. Details of the second response code will be described below.

CGHF 658 is a functional block that performs extended CBSD group processing (referred to as Enhanced CBSD group Handling) introduced in Non Patent Literature 2 "WINNF-TS-3002".

The SRMG 659 generates a response message of the SAS 69. The SRMG 659 generates a response message including the first response code generated by the IPPF 656 and the second response code generated by the CxM 657. Details of the response code generated by the SRMG 659 will be described below.

The radio communication unit 61 includes a transmission unit 611 and a reception unit 612. The transmission unit 611 transmits the response code generated by the SRMG 659. The reception unit 612 receives a request from the CBSD 49.

In the CBRS, the SAS 69 makes a determination related to primary system protection. This primary system is a system that performs a primary communication service. The coexistence of GAA can be performed based on the CBRS Alliance standard, for example. The SAS at this time can adopt a configuration as illustrated in FIG. 17. The standard of WINNF provides a mechanism capable of defining various types of groups. For example, WINNF defines a group of a type referred to as a Coexistence Group (CxG).

The CxG performs coordination of interference among the CBSDs 49 in a group according to a predetermined GAA interference control policy (various interference control policies are allowed and a group ID is specified for each policy). Although the WINNF standard defines the CxG, it has not defined a specific GAA interference control policy, and accepts various GAA interference control policies.

Therefore, the CBRS Alliance standard defines a type of CxG referred to as CBRS Alliance Coexistence Group (with a group ID of the coexistence group being CBRS_AL-LIANCE) which stipulates a CBRS Alliance's own GAA interference control policy so as to promote GAA coexistence between LTE-TDD, NR-TDD, or between LTE-TDD and NR-TDD. A CxM (CxM 657) is defined as an entity that executes the CBRS Alliance's own GAA interference control policy. On the other hand, for implementation of CxM, it is practically essential to support a feature referred to as Enhanced CBSD Group Handling defined in Non Patent Literature 2 "WINNF-TS-3002". Therefore, a CBSD Group Handling function is provided in addition to the CxM.

In the GAA coexistence by the CxM, grouping parameters related to LTE-TDD, NR-TDD, and the like are notified from the CBSD 49 to the CxM by utilizing a GroupParam object defined in various request messages of the SAS-CBSD protocol. Furthermore, the configuration information (grouping configuration) determined based on these parameters can be notified to the CBSD 49 by utilizing a GroupConfig object defined in various request response messages of the SAS-CBSD protocol.

Note that the IPPF 656 is an example of a first determination unit described in the claims. The CxM 657 is an example of a second determination unit described in the claims.

(Configuration of Request)

A configuration of a registration request from the CBSD 49 will be described with reference to FIG. 18. FIG. 18 is a diagram illustrating a registration request according to the second embodiment of the present disclosure. Note that the registration request corresponds to a request for use of a frequency band from the base station device 40. Note that FIGS. 18 to 21 are defined in Non Patent Literature 2 "WINNF-TS-3002".

In FIG. 18, "Parameter" represents a parameter item. "R/O/C" represents "Required", "Optional", or "Conditional". "Parameter Information" represents information regarding the parameter. As illustrated in FIG. 18, a registration request 800 (registrationRequest) is a message configured by registrationRequest parameters of a RegistrationRequest object array type. This RegistrationRequest object is defined in a configuration including a user ID (userId), an FCC ID (fccId) of the CBSD 49, a serial number of the CBSD 49 (cbsdSerialNumber), and the like. Furthermore, a groupingParam object (object 801), which is an object including CBSD grouping information, can be added to the RegistrationRequest object. As illustrated in FIG. 18, the object 801 is configured by the groupingParam parameter of the GroupParam object array type. This object 801 is notified to the CxM 657.

(Configuration of Response)

A configuration of a registration response of SAS 69 will be described with reference to FIG. 19. FIG. 19 is a diagram illustrating a registration response according to the second embodiment of the present disclosure. Note that the registration response corresponds to a response of the communication control device 60.

As illustrated in FIG. 19, a response 810 (registrationResponse) includes registrationResponse parameters of a RegistrationResponse object (object 811) array type. This object 811 can include a groupingConfig parameter of the GroupConfig object (an object 820 described below) array type and a response parameter of the Response object (an object 812) type. This object 812 includes a numerical response code (responseCode). This response code corresponds to the first response code generated by the IPPF 656.

The object 820 will be described with reference to FIG. 20. FIG. 20 is a diagram illustrating a definition of a GroupConfig object according to the second embodiment of the present disclosure. The object 820 being a GroupConfig object may include groupType, groudId, suppoutedBySas, and groupConfigInfo. Among these, groupConfigInfo is a parameter of a GroupConfigInfo object (an object 830) type. The above-described configuration information (Grouping configuration) can be described in the GroupConfigInfo object.

The object 830 will be described with reference to FIG. 21. FIG. 21 is a diagram illustrating a definition of a GroupConfigInfo object according to the second embodiment of the present disclosure. The object 830 being a GroupConfigInfo object can include a cbrsAllianceConfig parameter of a CbrsAllianceConfig object type and a groupResponse parameter of a GroupResponse object (an object 831) type. Furthermore, the object 831 being a GroupResponse object can include a group response code (groupResponseCode) parameter of a numerical type and a shortDescripiton parameter of a string type. This group response code corresponds to the second response code generated by the CxM 657.

In this manner, the response 810 includes: the Response object (object 812) having the first response code (responseCode); and the GroupConfig object (object 820). A newly defined GroupResponse object (object 831), including a group response code (groupResponseCode) corresponding to the second response code, is disposed in the GroupConfig object (object 820). This makes it possible to dispose the second response code in a zone different from the first response of the response 810. The SAS 69 can notify the CBSD 49 of the determination content of the CxM 657 without overwriting over the judgment result of the IPPF 656.

As a basic behavior, the CBSD 49 based on the specification of Non Patent Literature 1 operates based on the first response code. By disposing the second response code in the response 810 separately from the first response code, it is possible to prevent hindrance of the basic behavior of the CBSD 49 due to an error notified by the second response code.

Although the second embodiment has described the group response code by taking the CBRS Alliance Coexistence Group as an example, the group response code is also applicable to other types of groups. For example, it is possible to perform application to Coexistence Group, Single Frequency Group, and the like. Note that the CBRS Alliance Coexistence Group is an example of a coexistence group described in the claims.

(Configuration of Response Code)

The response code (responseCode) will be described with reference to FIG. 22. FIG. 22 is a diagram illustrating a configuration example of a first response code according to the second embodiment of the present disclosure. In FIG. 22, "code number" is a numerical value representing a response code. "Response" is the name of the response code. "Description" represents the meaning of the response code. The example of FIG. 22 assumes a response code represented by a 3-digit numerical value.

The code number "0" indicates normal termination of the request. The code number "100" indicates a case where the SAS 69 does not support the version of the protocol used in the request. The code number "101" is a response code in a case where the CBSD 49 that has transmitted the request is blacklisted. The code number "102" represents a missing essential parameter. The code number "103" indicates that invalidity of the parameter. The code number "104" is a response code in a case where there is an error in the certificate used in the HTTPS communication. The code number "105" is a response code in a case where the CBSD 49 that has transmitted the request is deregistered by the SAS 69.

The code number "200" is a response code in a case where a part of registration information necessary for registration is not yet registered. The code number "201" indicates an error of the group parameter.

The code number "300" is a response code in a case where at least a part of the frequency range specified in the request is out of the CBRS band.

The code number "400" is a response code in a case where an operational parameter causes a large amount of interference in a request for a grant. The code number "$40_1$" is a response code in a case where the operational parameter in in a conflict with the grant included in the CBSD 49 that has transmitted the request.

The code number "500" is a response code in a case where the grant is terminated. The code number "501" is a response code in a case where the radio wave transmission based on the grant is primarily stopped. The code number "502" is a response code in a case where the states of the grants are not synchronized between the SAS 69 and the CBSD 49.

FIG. 22 illustrates an example of response codes in a format classified into a response code group that groups the response codes related to each other. The response code group is identified by the numerical value of the first digit of the three-digit code number. The 100 series is a response code group representing a general error independent of processing such as registration. The 200 series is a response code group representing an error specific to the registration process. The 300 series are response code groups representing errors specific to spectrum inquiry processing. The 400 series is a response code group representing an error specific to grant processing. The 500 series is a response code group representing an error specific to heart beat processing. By using the response codes classified for each response code group, the CBSD 49 can selectively perform processing for each response code group. This leads to improvement in the convenience.

(Configuration of Group Response Code)

The group response code (groupResponseCode) will be described with reference to FIG. 23. FIG. 23 is a diagram illustrating a configuration example of a second response code according to the second embodiment of the present disclosure. In FIG. 22, common terms are used for portions common to those in FIG. 23, and description thereof is omitted.

The code number "0" indicates a case where the grouping parameter is normally processed. The code number "100" indicates a case where the CxM 657 does not support the version of the grouping parameter. The code number "101" is a response code in a case where the CBSD 49 that has transmitted the request is blacklisted for the CBRS Alliance Coexistence Group. The code number "102" represents a missing essential grouping parameter. The code number "103" indicates invalidity of the grouping parameter.

The code number "104" is a response code in a case where time synchronization with other CBSDs 49 in the CBRS Alliance Coexistence Group is not established. The synchronization can be confirmed by referring to a data field of an HTTP request header.

The code number "105" is a response code in a case where the CBSD 49 that has transmitted the request is automatically excluded from the CBRS Alliance Coexistence Group by the CxM 657. For example, when the first response code is "105 (DEREGISTER)", returning a group response code of this value can notify that it is automatically excluded from the group at the same time as the automatic deregistration. It is possible to notify the CBSD 49 that the parameter is excluded from the interference control in the group. Furthermore, for example, this group response code can be returned when the condition of NON_CONFORMED_ CHANNEL is satisfied.

The code number "106" is a response code when automatically excluded from the neighboring CBRS Alliance Coexistence Group due to the requested TDD Configuration. For example, when the response code for the grant request is "0 (SUCCESS)", returning this group response code can issue a warning that the grant is permitted but may cause crosslink interference.

The code number "107" indicates invalidity of some or all of the subgroup information of the CBRS Alliance Coexistence Group.

The code number "400" indicates a case where the frequency range of the request of the grant does not conform to specified band separation (Channelization). The CBRSA standard defines GAA channelization. For example, it is assumed that the first response code in the grant response is SUCCESS (grant is issued) and the second response code is this code number (400). The CxM 657 can perform interference control only when conformation to predetermined GAA channelization is achieved. Therefore, when the issued grant is to be continuously used by the CBSD 49, the above-described code number "105 (DISASSOCIATE)" can be issued to exclude the CBSD 49 from the group. The case where the CBSD 49 continues to use the grant corresponds to, for example, a case where the heart beat request related to the grant is notified a predetermined number of times or more.

The code number "500" is a response code when the notified group configuration information is changed. For example, the code is used when there is a change in Group membership and it is desired to change the setting due to interference control. In addition, the code can be used, for example, when the first response code is "500 (TERMINATED_GRANT)" or "501 (SUSPENDED_GRANT)". When a recommended operational parameter for newly acquiring a grant is notified, the code can be used for notification of grouping configuration to be used in radio wave transmission based on the new grant.

FIG. 23 illustrates an example of the second response code (group response code) generated based on the first response code group in FIG. 22. It is possible to classify the second response codes associated with the response code group of the first response codes.

The response code group of the group response codes is merely an example, and can be defined based on a response code group different from the existing response code. The code number is merely an example, and another code number can be defined as long as the code number is related to the decision-making of the CxM 657.

These group response codes can also be transmitted when the response code (first response code) is "0 (SUCCESS)". That is, when the first response code indicates normal termination, it is possible to notify that there is an abnormality in the grouping information. For example, information usually notified by the auxiliary information for error notification (either or both of the responseMessage and the responseData included in the object 812 in FIG. 19) can be notified. By including such information in the response code, it is also possible to notify that there is an abnormality in the grouping information.

The code can also be combined with another response code. The above-described example described in a case where the response code (first response code) is "500 (TERMINATED_GRANT)" or "501 (SUSPENDED_GRANT)" is an example of a case where the response code is used in combination with another response code. Furthermore, for example, in a case where there is an abnormality in the grouping information at the time of a response to the registration request, the response code (first response code) may be set to "201" to designate a value corresponding to the group response code.

(CBSD Processing)

Having received the group response code (second response code) from the CxM 657, the CBSD 49 can perform an operation according to the group response code. For example, requesting can be performed with the request (registration request or the like) which has been corrected based on the group response code.

An operation of the CBSD 49 (the base station device 40) will be described with reference to FIG. 24. FIG. 24 is a diagram illustrating an example of an operation of the base station device according to the second embodiment of the present disclosure. In FIG. 24, "code number" and "response" respectively represent "code number" and "response" of the returned group response code. The "operation" represents an operation that can be taken by the CBSD 49.

In the case of the code number "0", the CBSD 49 operates according to the grouping configuration. In the case of the code number "100", the CBSD 49 adapts the version to match the version used by the CxM 657. In the case of the code number "101", the CBSD 49 waits until it is deleted from the blacklist. In the case of the code number "102", the CBSD 49 acquires the essential parameter. In the case of the code number "103", the CBSD 49 corrects the invalid parameter. In the case of the code number "104", the CBSD 49 performs synchronization processing. In the case of the code number "105", the CBSD 49 corrects a necessary parameter and applies for participation in the group in the next request.

In the case of the code number "106", the CBSD 49 performs measurement and continues the operation when there is no operational problem. The CBSD 49 can also be adapted to the TDD configuration recommended by the CxM 657. The CBSD 49 can also reduce power to decrease interference.

In the case of the code number "107", the CBSD 49 corrects the invalid value. In the case of the code number "400", the CBSD 49 performs an operation based on the judgment of the operator. In the case of the code number "500", the CBSD 49 sets parameters based on the grouping configuration recommended from the CxM 657.

(Configuration of Request)

The configuration of the request will be described with reference to FIG. 25. FIG. 25 is a diagram illustrating a configuration of a request according to the second embodiment of the present disclosure. FIG. 25 illustrates the request in the JSON format. FIG. 25 illustrates an example of a registration request (request 840). "CBRS_ALLIANCE" and "SFG_1" are defined as groupingParam in lines 23 and 37, respectively.

(Configuration of Response)

The configuration of the response will be described with reference to FIG. 26. FIG. 26 is a diagram illustrating a configuration of a response according to the second embodiment of the present disclosure. FIG. 26 illustrates an example of a response (response 819) to the registration request of FIG. 25. The response code (responseCode) is located at the sixth line. In addition, the group response code (GroupResponseCode) is located at the 23rd line and the 35th line as members of the "CBRS_ALLIANCE" group and the "SFG_1" group, respectively.

(Another Configuration of Request)

The configuration of the heartbeat request will be described with reference to FIG. 27. FIG. 27 is a diagram illustrating another configuration of the request according to the second embodiment of the present disclosure. FIG. 27 illustrates an example of a heartbeat request (request 850).

(Another Configuration of Response)

The configuration of the response will be described with reference to FIG. 28. FIG. 28 is a diagram illustrating another configuration of the response according to the second embodiment of the present disclosure. FIG. 28 illustrates an example of a response (request 851) to the heartbeat request of FIG. 27. The group response code (GroupResponseCode) is located at the 36th line and the 47th line as members of the "CBRS_ALLIANCE" group and the "SFG_1" group, respectively. Even in a case where "groupingParam" is not located in the request 850 of FIG. 27, the group response code can be notified using "groupId" such as "CBRS_ALLIANCE" described above.

Note that a group response code can be added to a response to a request other than registration and heartbeat.

(Request and Response Processing)

Figure 29:
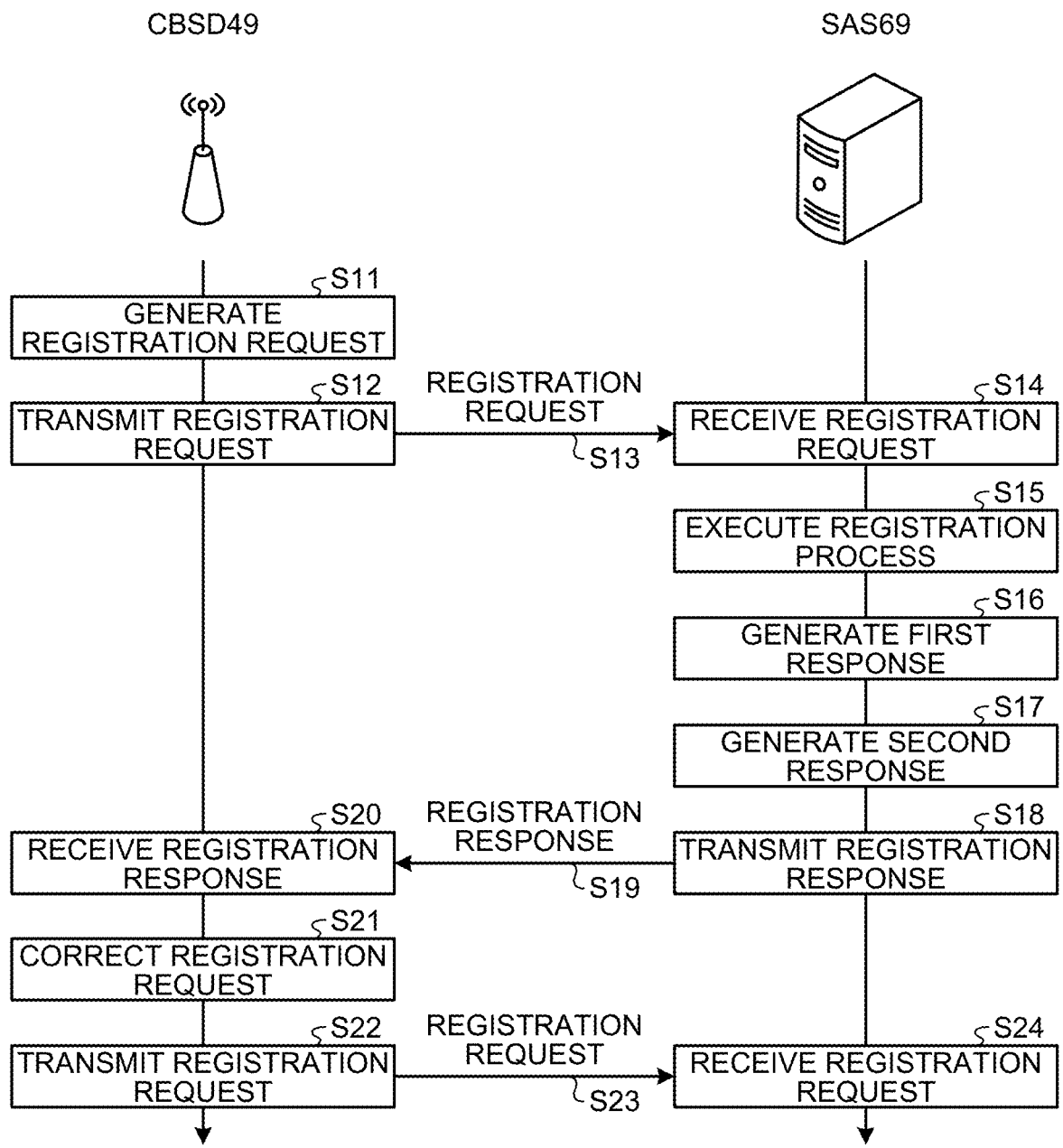
FIG. 29 is a diagram illustrating processing according to the second embodiment of the present disclosure.

Request and response processing will be described with reference to FIG. 29. FIG. 29 is a diagram illustrating processing according to the second embodiment of the present disclosure. First, the CBSD 49 generates a registration request (step S11). Next, the CBSD 49 transmits the generated registration request (step S12). This registration request is transmitted to the SAS 69 (step S13).

The SAS 69 receives the registration request (step S14). Next, the SAS 69 executes a registration process (step S15). Next, the SAS 69 generates a first response code (step S16). This is performed by the IPPF 656. Next, the SAS 69 generates a second response code (step S17). This is performed by the CxM 657. Next, the SAS 69 transmits a registration response including the first response code and the second response code (step S18). This registration response is transmitted to the CBSD 49 (step S19).

The CBSD 49 receives the registration response (step S20). In a case where the registration is not permitted, the CBSD 49 corrects the registration request based on the second response code (step S21). Next, the CBSD 49 transmits the corrected registration request (step S22). This registration request is transmitted to the SAS 69 (step S23) and received by the SAS 69 (step S24). The processes described above enables the request and the response.

In this manner, the communication control device (SAS 69) according to the second embodiment transmits the first response code (response code) including the second response code (group response code) to the base station device (CBSD 49). This makes it possible to prevent a conflict between the first response and the second response.

<Effects>

The communication control device 60 of the present disclosure includes the reception unit 612, the first determination unit 646, the second determination unit 647, and the transmission unit 611. The reception unit 612 receives, from a secondary use communication device (base station device 40) that provides a secondary communication service that is a communication service using at least a part of a frequency band used by a primary communication service, a request for using the frequency band, including information of a secondary use communication device group including the secondary use communication device (base station device 40). The first determination unit 646 generates a first response according to a result of a judgment regarding use of the frequency band in the received request. Based on the judgment result, the second determination unit 647 generates a second response including the information regarding the use in the secondary use communication device group. The transmission unit 611 transmits the generated first response and second response to the secondary use communication device (base station device 40). This brings an effect of transmitting the second response in addition to the first response. It is possible to notify information related to use in the secondary use communication device group and prevent damage in the first response.

In addition, the first determination unit 646 may make the judgment based on protection of the primary communication service for use of the frequency band in the request. This makes it possible to protect the primary communication service.

In addition, the first determination unit 646 may make the judgment based on protection of the primary communication service against the interference associated with use of the frequency band in the request. This makes it possible to protect the primary communication service against interference.

In addition, the first determination unit 646 may generate a first response code representing the first response, and the second determination unit may generate a second response code representing the second response. This makes it possible to represent the first response and the second response by the response codes.

Furthermore, the transmission unit 611 may transmit the first response code including the second response code. This makes it possible to extend the first response code by the second response code.

In addition, the first determination unit 646 may generate the first response code classified into a response code group which groups a plurality of responses corresponding to and related to the judgment result, while the second determination unit may generate the second response code based on the response code group. This makes it possible to perform the processes separately for each response code group.

Furthermore, the secondary use communication device group may be configured as a coexistence group, and the second determination unit 647 may generate the second response code including the information related to the use in the coexistence group. This makes it possible to notify information regarding use in the coexistence group.

In addition, the second determination unit 647 may generate a response code indicating a state in which the secondary use communication device (base station device 40) and another secondary use communication device (base station device 40) in the coexistence group are asynchronous with each other. This makes it possible to notify that the state is asynchronous with another secondary use communication device (base station device 40) of the coexistence group.

In addition, the second determination unit 647 may generate a response code indicating exclusion of the secondary use communication device (base station device 40) from the coexistence group. This makes it possible to notify the exclusion from the coexistence group.

In addition, the second determination unit 647 may generate a response code indicating a state in which the secondary use communication device (base station device 40) and another secondary use communication device in the coexistence group are having crosslink interference with each other. This makes it possible to notify the state of the crosslink interference with another secondary use communication device of the coexistence group.

In addition, the second determination unit 647 may generate the second response code indicating invalidity of at least a part of the subgroup information of the coexistence group. This makes it possible to notify invalidity of at least a part of the subgroup information of the coexistence group.

In addition, the second determination unit 647 may generate the second response code indicating incompatibility of the requested frequency band with the allocated band of the primary communication service. This makes it possible to notify incompatibility with the allocated bandwidth of the primary communication service.

In addition, the second determination unit 647 may generate the second response code indicating a change in the configuration information transmitted when the use of the secondary use communication device (base station device 40) is determined. This makes it possible to notify the change in the configuration information.

Furthermore, the communication device (base station device 40) of the present disclosure includes the transmission unit (transmission processing unit 412) and the reception unit (reception processing unit 411). The transmission unit (transmission processing unit 412) transmits a request for using at least a part of the frequency band to perform a secondary use communication service using the frequency band used by the primary communication service to the communication control device that controls use of the frequency band. The reception unit (reception processing unit 411) receives the first response according to the result of the judgement related to the use of the frequency band based on the request and receives the second response including information related to the use in the secondary use communication device group including its own secondary use communication device (base station device 40) determined based on the judgment. The communication device performs the secondary use communication service based on the received first response and second response. This brings an effect of receiving the second response in addition to the first response. It is possible to acquire information related to use in the secondary use communication device group and prevent damage in the first response.

Furthermore, the transmission unit (transmission processing unit 412) may transmit the request corrected in accordance with the received second response, to the communication control device. This makes it possible to perform the request reflecting the second response content again.

Furthermore, the communication control method of the present disclosure includes: receiving, from a secondary use communication device (base station device 40) that provides a secondary communication service that is a communication service using at least a part of a frequency band used by the primary communication service, a request for using the frequency band including information regarding a secondary use communication device group including the secondary use communication device (base station device 40); generating a first response according to a result of a judgment regarding use of the frequency band in the received request; generating a second response including information regarding use in the secondary use communication device group based on the result of the judgment; and transmitting the generated first response and second response to the secondary use communication device (base station device 40). It is possible to notify information related to use in the secondary use communication device group and prevent damage in the first response.

<Supplementary Note>

(1)
A communication control device comprising:
a reception unit that receives, from a secondary use communication device that provides a secondary communication service that is a communication service using at least a part of a frequency band used by a primary communication service, a request for using the frequency band including information regarding a secondary use communication device group including the secondary use communication device;
a first determination unit that generates a first response according to a result of a judgment regarding the use of the frequency band in the received request;
a second determination unit that generates a second response including information regarding the use in the secondary use communication device group based on the result of the judgment; and
a transmission unit that transmits the generated first response and second response to the secondary use communication device.

(2)
The communication control device according to the above (1),
wherein the first determination unit makes the judgement based on protection of the primary communication service in use of the frequency band in the request.

(3)
The communication control device according to the above (2),
wherein the first determination unit makes the judgement based on protection of the primary communication service against interference in the use of the frequency band in the request.

(4)
The communication control device according to any one of the above (1) to (3),
wherein the first determination unit generates a first response code representing the first response, and
the second determination unit generates a second response code representing the second response.

(5)
The communication control device according to the above (4),
wherein the transmission unit transmits the first response code including the second response code.

(6)
The communication control device according to the above (5),
wherein the first determination unit generates the first response code classified into a response code group which groups a plurality of responses corresponding to and related to the judgment result, and
the second determination unit generates the second response code based on the response code group.

(7) The communication control device according to the above (5),
wherein the secondary use communication device group is configured as a coexistence group, and
the second determination unit generates the second response code including information related to the use in the coexistence group.

(8) The communication control device according to the above (7), wherein the second determination unit generates a response code indicating a state in which the secondary use communication device and another secondary use communication device in the coexistence group are asynchronous with each other.

(9)
The communication control device according to the above (7),
wherein the second determination unit generates a response code indicating exclusion of the secondary use communication device from the coexistence group.

(10)
The communication control device according to the above (7), wherein the second determination unit generates a response code indicating a state of crosslink interference between the secondary use communication device and another secondary use communication device in the coexistence group.

(11)
The communication control device according to the above (7),
wherein the second determination unit generates the second response code indicating invalidity of at least a part of subgroup information regarding the coexistence group.

(12)
The communication control device according to the above (7),
wherein the second determination unit generates the second response code indicating incompatibility of the requested frequency band with an allocated band of the primary communication service.

(13)
The communication control device according to the above (7),
wherein the second determination unit generates the second response code indicating a change in configuration information transmitted when the use of the secondary use communication device is determined.

(14)
A communication device comprising:
a transmission unit that transmits a request for using at least a part of a frequency band used by a primary communication service in order to perform a secondary use communication service using the frequency band, to a communication control device that controls use of the frequency band; and a reception unit that receives a first response according to a result of a judgment related to the use of the frequency band based on the request as well as receiving a second response including information related to the use in a secondary use communication device group including its own secondary use communication device determined based on the judgment, wherein the secondary use communication service is performed based on the received first response and second response.

(15)

The communication device according to the above (14), wherein the transmission unit transmits the request corrected in accordance with the received second response, to the communication control device.

(16)

A communication control method comprising:

receiving, from a secondary use communication device that provides a secondary communication service that is a communication service using at least a part of a frequency band used by a primary communication service, a request for using the frequency band including information regarding a secondary use communication device group including the secondary use communication device;

generating a first response according to a result of a judgment regarding the use of the frequency band in the received request;

generating a second response including information regarding the use in the secondary use communication device group based on the result of the judgment; and transmitting the generated first response and second response to the secondary use communication device.

(17)

A communication method including:

transmitting a request for using at least a part of a frequency band used by a primary communication service in order to perform a secondary use communication service using the frequency band, to a communication control device that controls use of the frequency band;

receiving a first response according to a result of a judgment related to the use of the frequency band based on the request as well as receiving a second response including information related to the use in a secondary use communication device group including its own secondary use communication device determined based on the judgment; and performing the secondary use communication service based on the received first response and second response.

REFERENCE SIGNS LIST

1000, 2A, 2B COMMUNICATION SYSTEM
30 TERMINAL DEVICE
40 BASE STATION DEVICE
60 COMMUNICATION CONTROL DEVICE
69 SAS
61 RADIO COMMUNICATION UNIT
611 TRANSMISSION UNIT
612 RECEPTION UNIT
646 FIRST DETERMINATION UNIT
647 SECOND DETERMINATION UNIT
649 GENERATOR
656 IPPF
657 CxM
659 SRMG

The invention claimed is:

1. A communication control device comprising:
control circuitry that;
controls a receiver to receive, from a secondary use communication device that provides a secondary communication service, a request for using at least a part of a frequency band that is used by a primary communication service the request including information regarding a secondary use communication device group that includes the secondary use communication device; and
in response to the request:
generates a first response code according to a result of a judgment regarding the requested use of the frequency band;
generates, based on the result of the judgment, a second response code regarding the requested use of the frequency band in the secondary use communication device group; and
controls a transmitter to transmit a response signal that includes the first response code and the second response code to the secondary use communication device.

2. The communication control device according to claim 1,
wherein the control circuitry makes the judgement based on protection of the primary communication service in use of the frequency band in the request.

3. The communication control device according to claim 2,
wherein the control circuitry makes the judgement based on protection of the primary communication service against interference in the use of the frequency band in the request.

4. The communication control device according to claim 1,
wherein the first response code is classified into a response code group which groups a plurality of responses corresponding to and related to the result of the judgment, and
the control circuitry generates the second response code based on the response code group.

5. The communication control device according to claim 1,
wherein a secondary use communication device group is configured as a coexistence group, and
the second response code includes information related to the coexistence group.

6. The communication control device according to claim 5, wherein the second response code indicates a state in which the secondary use communication device and another secondary use communication device in the coexistence group are asynchronous with each other.

7. The communication control device according to claim 5,
wherein the second response code indicates exclusion of the secondary use communication device from the coexistence group.

8. The communication control device according to claim 5, wherein the control circuitry generates a response code indicating a state of crosslink interference between the secondary use communication device and another secondary use communication device in the coexistence group.

9. The communication control device according to claim 5,
wherein the second response code indicates invalidity of at least a part of subgroup information regarding the coexistence group.

10. The communication control device according to claim 5,
wherein the second response code indicates incompatibility of the requested frequency band with an allocated band of the primary communication service.

11. The communication control device according to claim 5,
wherein the second response code indicates a change in configuration information transmitted when the use of the secondary use communication device is determined.

12. A secondary use communication device comprising:
a transmitter that transmits a request for using at least a part of a frequency band that is used by a primary communication service in order to perform a secondary use communication service using the frequency band, to a communication control device that controls use of the frequency band; and
a receiver that receives from the communication control device based on the request, a response signal that includes:
a first response code generated by the communication control device according to a result of a judgment related to the requested use of the frequency band, and
a second response code that is generated by the communication control device based on the judgment, the second response code including information related to the requested use in a secondary use communication device group that includes the secondary use communication device.

13. The secondary use communication device according to claim 12,
wherein the transmitter transmits the request corrected in accordance with the received second response, to the communication control device.

14. A communication control method performed by a communication control device and comprising:
receiving, from a secondary use communication device that provides a secondary communication service, a request for using at least a part of a frequency band that is used by a primary communication service, the request including information regarding a secondary use communication device group that includes the secondary use communication device; and
in response to the request:
generating a first response code according to a result of a judgment regarding the requested use of the frequency band;
generating, based on the result of the judgment, a second response code regarding the requested use of the frequency band in the secondary use communication device group; and
transmitting a response signal that includes the first response code and the second response code to the secondary use communication device.

* * * * *